(12) United States Patent
Weber

(10) Patent No.: US 10,109,384 B2
(45) Date of Patent: Oct. 23, 2018

(54) SYSTEM FOR GENERATION OF USEFUL ELECTRICAL POWER FROM ISOTOPIC EMISSIONS

(71) Applicant: David Weber, Lauderdale Lakes, FL (US)

(72) Inventor: David Weber, Lauderdale Lakes, FL (US)

(*) Notice: Subject to any disclaimer, the term of this patent is extended or adjusted under 35 U.S.C. 154(b) by 1179 days.

(21) Appl. No.: 13/961,125

(22) Filed: Aug. 7, 2013

(65) Prior Publication Data
US 2014/0035435 A1 Feb. 6, 2014

Related U.S. Application Data

(63) Continuation-in-part of application No. 11/601,493, filed on Nov. 17, 2006, now abandoned.

(51) Int. Cl.
| H02N 11/00 | (2006.01) |
| G21H 1/00 | (2006.01) |
| G21H 1/04 | (2006.01) |
| H01J 23/05 | (2006.01) |

(52) U.S. Cl.
CPC ............... *G21H 1/00* (2013.01); *G21H 1/04* (2013.01); *H01J 23/05* (2013.01); *H02N 11/002* (2013.01)

(58) Field of Classification Search
CPC .. G21H 1/00; G21H 1/04; G21H 1/08; G21H 23/075; H03C 3/32; H01J 25/50; H01J 23/213
USPC ......... 315/39.69, 39.75, 39.51, 39.57, 39.61, 315/39.71, 39.63, 39.55; 310/300
See application file for complete search history.

(56) References Cited

U.S. PATENT DOCUMENTS

| 2,108,830 A * | 2/1938 | Skellett | H03B 9/01 |
| | | | 313/103 R |
| 2,408,903 A * | 10/1946 | Biggs | H01J 23/213 |
| | | | 315/39.61 |
| 2,433,403 A * | 12/1947 | Skellett | H01J 21/02 |
| | | | 313/261 |

(Continued)

FOREIGN PATENT DOCUMENTS

GB 617251 A * 1/1946 ............ H01J 23/213

OTHER PUBLICATIONS

Cristea et al. "Use of a Converted Magnetron for Making Electric Generators with Radioisotopes or a Converting Cell of the Fission Nuclear Energy" Institutul de Fizica Atomica, Bucharest (Romania), IFAFR1381975, Jun. 1975.*

*Primary Examiner* — Burton Mullins
(74) *Attorney, Agent, or Firm* — Melvin K. Silverman

(57) ABSTRACT

Particles emitted by radio-isotopic by-products of nuclear fission are used as a power source at the cathode of a magnetron system. Particles include high energy electrons having a large associated EMF. In the system a radial electrical vector E, between the cathode and anode, interacts with an axial magnetic vector B vector to produce an E×B force that rotates the particles about the system axis. These emissions are within a set range of velocities. The angular velocity and geometry of a rotating field, known as a space charge wheel (SCW), may be modulated by an external RF inputs to cavities of an anode block and the use of concentric biasing grids between the cathode and anode block. The SCW induces LC values into cavities of the anode, exciting them and producing electrons resonance which may be used to generate power.

14 Claims, 24 Drawing Sheets

(56) References Cited

U.S. PATENT DOCUMENTS

| | | | | |
|---|---|---|---|---|
| 2,492,313 A | * | 12/1949 | Okress | H01J 23/05 |
| | | | | 174/50.55 |
| 2,517,120 A | * | 8/1950 | Linder | G21H 1/02 |
| | | | | 310/304 |
| 5,280,218 A | * | 1/1994 | Smith | H01J 23/075 |
| | | | | 313/304 |
| 5,552,672 A | * | 9/1996 | Rosenberg | H01J 23/14 |
| | | | | 315/39.51 |
| 2004/0113560 A1 | * | 6/2004 | Brady | H01J 23/18 |
| | | | | 315/39.51 |

* cited by examiner

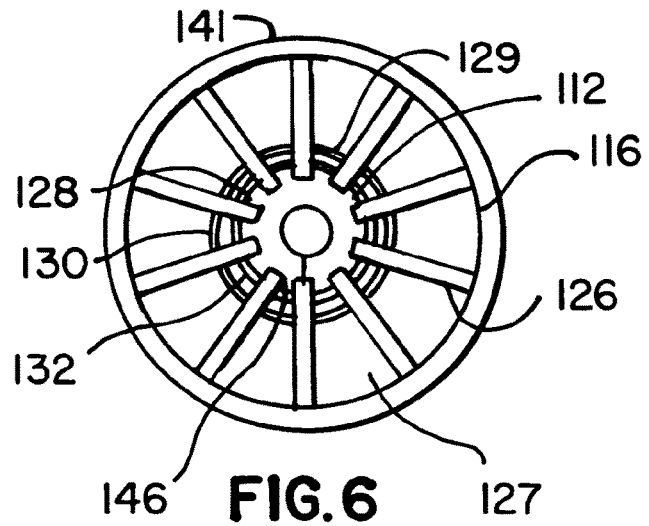
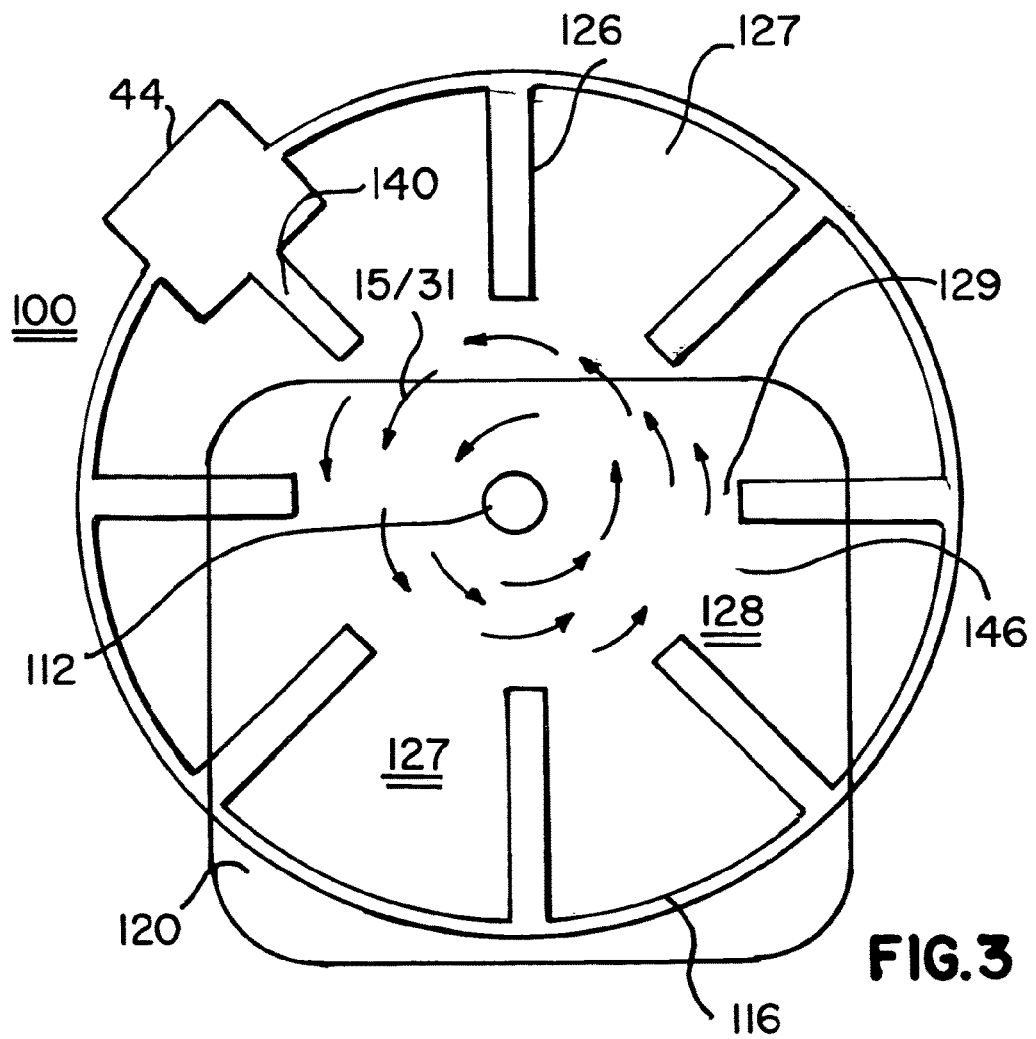

Alpha Particles

Beta Particles

Alpha Particles

400 beta
To FIG. 20 items 462 & 463 (grids)
To FIG. 20 item 412 (cold cathode)
To FIG. 17 items 462 & 463 (grids)
To FIG. 17 item 412 (cold cathode)

To FIG. 20 item 416 (anode block)
To FIG. 17 item 416 (anode block)

open
Stop Switch

478 alpha
To FIG. 21 items 462 & 463 (grids)
To FIG. 21 item 412A (cold cathode)
To FIG. 18 items 462 & 463 (grids)
To FIG. 18 item 412A (cold cathode)

To FIG. 21 item 416 (anode block)
To FIG. 18 item 416 (anode block)

open
Stop Switch

477

400

To FIG. 20 item 416 (anode block)
To FIG. 17 item 416 (anode block)

To FIG. 20 items 462 & 463 (grids)
To FIG. 17 items 462 & 463 (grids)

open
Stop Switch

To FIG. 21 item 416 (anode block)
To FIG. 18 item 416 (anode block)

To FIG. 21 items 462 & 463 (grids)
To FIG. 18 items 462 & 463 (grids)

open
Stop Switch

400
To FIG. 20 item 412 (cold cathode)
To FIG. 17 item 412 (cold cathode)
To FIG. 20 items 462 & 463 (grids)
To FIG. 17 items 462 & 463 (grids)
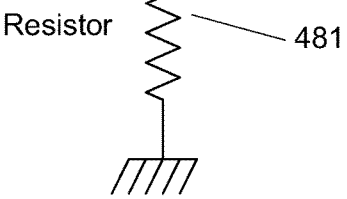
Resistor — 481
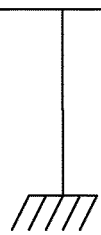
FIG. 29
To FIG. 21 item 412A (cold cathode)
To FIG. 18 item 412A (cold cathode)
To FIG. 21 items 462 & 463 (grids)
To FIG. 18 items 462 & 463 (grids)
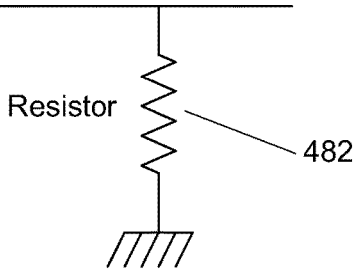
Resistor — 482
FIG. 30

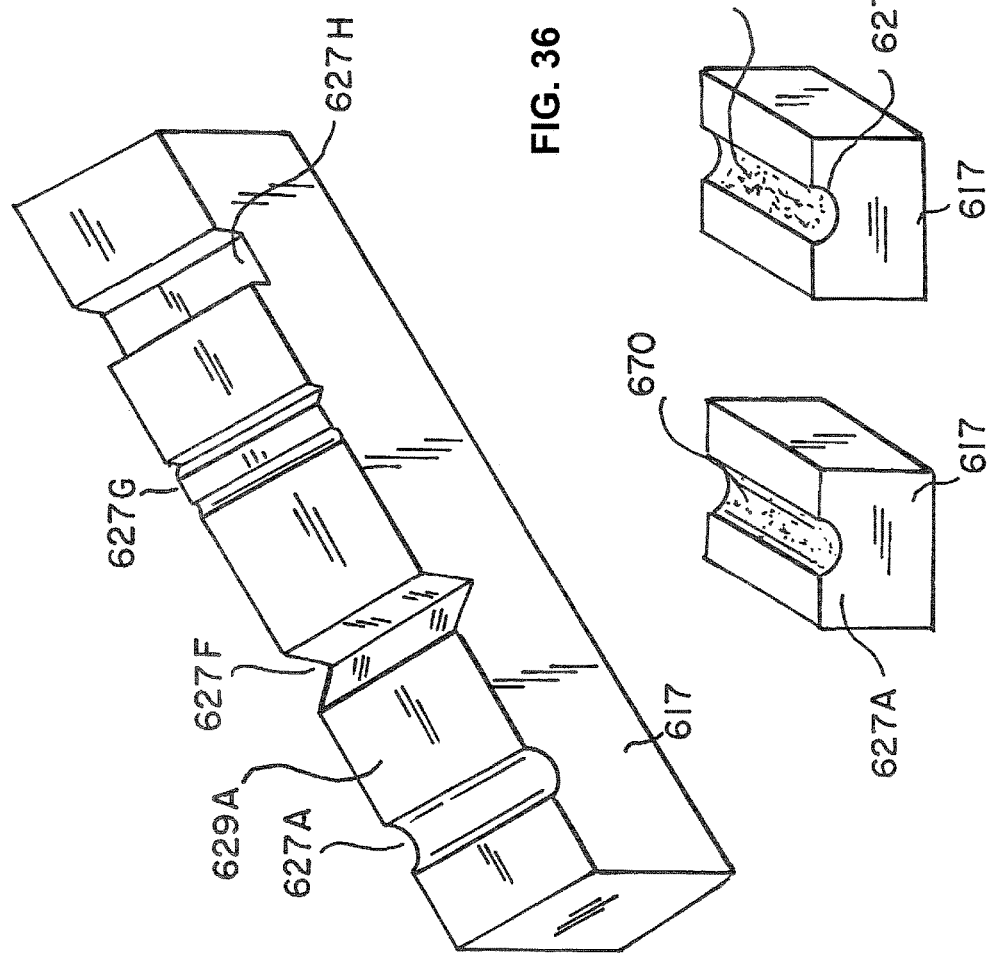

SYSTEM FOR GENERATION OF USEFUL ELECTRICAL POWER FROM ISOTOPIC EMISSIONS

CROSS REFERENCE TO RELATED APPLICATION

This application is a continuation-in-part of U.S. application Ser. No. 11/601,498, filed Nov. 17, 2006, which claims the benefit under 35 USC 119(e) of Provisional Patent Application Ser. No. 60/737,931, filed Nov. 18, 2005, both incorporated by reference herein in their entirety.

BACKGROUND OF THE INVENTION

A. Area of Invention

The use of beta or alpha particles of radio-isotopic elements that are typically by-products of nuclear fission are used as a power source for the generation of electricity.

B. Prior Art

Beta particles are a category of electrons emitted from a neutron of an atomic nucleus during its decay. Over a period, known as the isotope half life, a neutron of a decaying nucleus is converted into a proton, increasing by one the atomic number of the nucleus thereby increasing by one step in the periodic table an atom subject to such decay. The decay of the neutron may, in rare circumstances, result from a natural process. However, most such decay is the result of exposure of the nucleus to extreme conditions of heat and exposure to other sub-atomic particles, as often occur during nuclear fission. Such external conditions induce an instability into the basic quark structure of the neutron which normally consists of one so-called up or (u) quark and two so-called (d) or down quarks. In beta decay, the intra-nucleon electro-weak force W degrades one of the d quarks into an u quark creating, during the half life of the isotope, a structure of one d quark and two u quarks, that is, the quark structure of a proton. This causes the one step up in the periodic table of the atomic number of the affected nucleus.

The modern theory of beta decay was developed in 1934 by Enrico Fermi, but was not experimentally proven until 1956 by T. D. Lee and C. N. Yang. This process, as now understood, can be expressed by a Feynman diagram showing one of the d quarks of the decaying neutron transformed by an electro-weak interaction W into an u quark, from which reaction is released one electron and one anti-neutrino. This additional particle is necessary to express beta decay in terms that do not violate the principles of conservation of energy and momentum in sub-atomic interactions.

A neutron, if unassociated with a nucleus, will decay within a half life of about 600 seconds, but is stable if combined into a nucleus. When so combined with protons and other neutrons, it is governed by the nuclear strong force, and beta decay of the neutron would normally occur only over a period of many years, often centuries. When a neutron has fully decayed into a proton, a mass difference (decrease in energy of about 1.29 Mev) results, this representing the energy equivalent of the mass of the neutron which is lost during the above-described conversion of the d to an u quark. It has been shown that the beta decay electron carries away most of said energy difference in the form of kinetic energy and a strong magnetic field around the electron.

The present invention seeks to make effective and efficient use of such high energy electrons resultant of neutron decay and the electro-weak interaction W within the quark structure of the neutron which causes the decay.

Since the most accessible form of beta decay neutrons is that of the radio-isotopic by-products of nuclear fission, the instant invention may be appreciated in terms of a new use of these by-products, e.g., iron 55, nickel 63, strontium 90, tritium and others, as a power source or input, to a microwave-like radiation device known as a magnetron tube or simply a magnetron. The magnetron, as a source of microwaves, has existed since its discovery in the 1930s by Randall and Boot. The magnetron became a building block of what is now termed cavity magnetron microwave radar. The magnetron is also the basis of the standard microwave oven and may research applications.

Methods and apparatus for the direct conversion of radiation of radio-isotopes including beta decay electrons, to electrical energy was first suggested in 1988 by the physicist Paul M. Brown, and is reflected in his U.S. Pat. No. 4,835,433, directed to a resonant circuit battery using a radio isotope inside a coil of a tank circuit. The invention of Brown sought to employ the so-called beta voltaic effect to access the electrical potential associated with energy in the magnetic field of high energy beta electrons. See <www.r-exresearch.com/nucell/nucell.htm.> Isotopes which emit beta electrons occur within fuel rods of fission reactors and in the processing of uranium 238 and plutonium. Beta electrons are negatively charged and travel at a high velocity, approximately ¾ the speed of light (0.75 c), and exhibit an energy spectrum up to 0.782 MeV with a maxima at a lower level. Such spectra varies between isotopes.

In the nucleus of most naturally occurring elements, neutrons cannot decay because there is no available quark orbit for a decaying quark to occupy. As a result, most naturally-occurring nuclei are stable. However, when subjected to the high energy and extreme heat of nuclear fission, the d quark does decay, thus rendering the neutron unstable. When this occurs, the nucleus emits at least a beta electron and an anti-neutrino. Electrons emitted in this fashion thus exhibit exceedingly high levels of energy since they must possess sufficient energy and velocity to escape from the quark orbits of the decaying neutron of which they were a part. As has been determined by Brown and others, the magnetic energy associated with beta radiation electrons is several orders of magnitude greater than either the kinetic energy of those electrons or the static electric field energy of the same particles. As such, each emitted electron of a radio-isotope is associated with a powerful magnetic field which, if absorbed by a load, causes the field to collapse thus producing an EMF known as the beta voltaic effect. This field may however be used in a magnetron environment to produce a high energy rotating field and to induce microwaves, as is set forth below.

One of the primary drawbacks to the use of nuclear power is the radioactive waste which results from its fission process. Much of the waste of the system is in the form of "spent" fuel rods which cannot efficiently sustain the fission reaction process in the reactor. After serving their useful lives, the spent fuel rods are removed from the reactor, but the fuel rods still possesses a significant amount of their original energy capability, particularly in the electro-weak force W that acts within the nucleons. Even after removal from the reactor, the fission process continues in the fuel rods and strong force (inter-nucleon) energy continues to be released, mainly in the form of kinetic energy which is subsequently converted to heat. Some of this energy will however affect the neutron nucleons, stimulating neutron decay which gives rise to the beta decay noted above. Thus, the fuel rods continue to produce energy as they undergo radioactive decay, meaning they are still "hot" in terms of hard radiation. The rods, therefore, must be isolated until they are no longer radioactive, which can take thousands of years or more. There are no final procedures for the storage of spent fuel rods and other radioactive material. That is, no steps are underway to make use of the massive amount of radioactive decay energy, including beta decay energy, that exists in radioactive materials, especially in spent fuel rods and plutonium by-products. Thus, there remains a need for a method of safely and efficiently utilizing the decay particles of radio-isotopes, both beta and otherwise.

Other attempts have been made to convert radioactive decay energy to electrical energy, however, none have proved commercially viable due to their complexity, minimal power generating capability, or lack of durability. For example, a solid-state device which seeks to employ the energy associated with alpha and beta particles at a Fermi junction is taught by U.S. Pat. No. 5,825,839 (1998) to Baskis. It teaches that the energy associated with alpha and beta particles are in a range of 1000 to nearly one million KV (1 MeV) per particle, that is, six to twelve orders of magnitude greater than the voltage of an electron at rest. Radio-isotopes as a power source in micromechanical, i.e., nano-structures, are addressed in U.S. Pat. No. 6,479,920 (2002) to Lal, et al. The primary deficiency of these devices has been degradation of the structures by long term exposure to the high kinetic energies of the beta electrons. As such, physical durability is a key design factor in building a commercially viable beta electron device which, preferably, would take the form of a battery that is size-scalable up or down as a function of application.

Lindner (U.S. Pat. No. 2,517,120) teaches that the parameters of isotopes include a DC voltage and a form of energy that can be converted to a type of electrical current. He also teaches that such energy can be stored and that his design will repel emission when sufficiently charged. In addition, he teaches that isotopes have an impedance and how to calculate their impedance. Lindner however does not suggest that his emissions can be used to power a resonator of any type including those found in magnetrons, or that isotopes produce instantaneously accelerated electrons. In addition, what differentiates my invention is that the impedance of a cold isotope cathode affects the interaction space inside a magnetron and, more precisely affects the capacitance within that interaction space. This understanding is a critical aspect in designing a nuclear magnetron as taught herein.

The cold cathode in this invention uses an isotope (isotopic cathode acting as the emitter of energy) that produces instantaneous or W force accelerated electrons and/or alpharays and should not be confused with hot cathodes that produce thermionic electrons from heat that have to be accelerated using high external voltage, i.e., thermionic emissions. Such cold cathodes can and do release beta electrons, also referred to as beta rays, or beta particles. In the case of an isotopic cold cathode, they can produce alpha rays or particles. Beta rays and alpha rays however cannot both be used simultaneously. If a cold cathode did produce both types the invention would in fact cancel the effects needed from the cold cathode. The invention's isotopic cold cathode acts like an external power supply but in EM communication with the anode block of the inventive system. The concept of hot cathode devices and external power supply therefore do not apply to any aspect of this invention. This is an improvement in design of using high voltage cold cathode isotopes to produce a power source.

No prior art known to the inventors sets forth a method or apparatus for the conversion of energy associated with the electro-weak force W, the beta voltaic effect or alpha particle emission thereof into high energy microwaves and, in turn, use of such microwaves as an input for the evaporation of liquid as an input to an electrical turbine generator or, alternatively, use of such a microwave magnetron output as an input to microwave DC generators known in the art. The present invention addresses this need.

It is to be understood that each variety of isotope (singular cathode type) used this way produces an energy spectrum specific to that isotope. Such a magnetron system can be designed for a specific isotope but will need to be redesigned to operate with another isotope. This should not be confused with the standard linearly accelerated magnetron that uses high voltage to induce the acceleration of electrons typically from a neutral tungston cathode or other hot filament type cathode.

The geometry of the emissions of these magnetron systems differ due to the linear accelerated electrons produced from a hot cathode using a heat source versus or the instantaneously accelerated electrons from a cold cathode using the W force of a nuclear isotope. It should also be noted that X-rays and gamma rays have little or no effect on magnetron type devices or how they operate. However, there exist types of isotopes produced or byproducts of X-rays or gamma rays having electron emissions that may be suitable for use with my cold cathode technology.

In most cases, cold cathodes using isotopes will generate too much noise to be used in a standard type magnetron requiring a highly stable fixed frequency device with highly stable power output. Isotopes by nature produce an erratic form of emission or output making the isotopic nuclear magnetron, as taught herein, a noise type of device having permissible frequency fluctuations and changes in output power. But, in the invention, this does not affect the efficiency or production of energy needed to produce useful power.

The publication of Cristea et al (IFA-FR-138-1975) teaches that there existed a lack of electrons available from his cold cathode in the year 1975 needed for an isotopic magnetron system to operate correctly. That is, such magnetron devices circa 1975 employed a "point contact" with small cathode areas while, although using beta electrons, could not supply a sufficient number of electrons to actually to operate a Cristea type device. Cristea further made assumptions about his device that, over time, have proven to be incorrect. That is, he did not understand the roles of the interaction space, resonators and resonator matching, or how a space-charge wheel in the interaction space would work. Nor did he fully understand magnetic arc moments for a magnetron and did not indicate the voltage range in which his device could work or with what isotopes. In my opinion, Cristea's solution would have turned an isotopic magnetron into a non-functioning device or into a neutron reactor that would transform the magnetic materials used in the magnetron into other elements, thus losing their magnetic properties and degrading the space—charge wheel ("SCW") that he clearly did not understand. Cristea's goal was to take a standard magnetron, not designed to work within the energy range of an isotope and flood the standard hot cathode with electrons to make it work. That is, his assumption regarding how to make a standard magnetron work with any kind of nuclear fuel is not correct, since in most nuclear fuels, the effect of strong force will overwhelm that of the weak force. Cristea also does not address any power limitations, constant current issues, noise or other magnetron design factors he might use for control of emission velocity of beta electrons. Cristea thus failed to understand critical issues of performance as addressed herein.

Cristea IFA-FR-138-1975 also teaches that an isotopic magnetron will operate between a V1 and V2 voltage range. He, however, does not go into details as to how these ranges are set and operate. He also makes the assumption that his magnetron would work like a hot cathode magnetron. Cristea et al apparently had no idea as to how the resonator impedance operated at the time of his submission of the article and what needed to be taken into account. He assumed controlling electrons is the same in both a isotopic device and a hot cathode device. He was wrong in this assumption, and his results were of limited value due to his limited understanding of the underlying physics. He was correct, however, with the results he got from the device he used to do his testing. In his V1 voltage range, the lowest possible voltage of the magnetron, the operation range value is set by the magnetic field strength and the break over voltage point at which the magnetron will start to operate. His magnetrons looked like and operated like a Zener diode circuit with impedance (resistance) in them. See FIG. 31. His V2 point (the termination point of resonation). The V2 point is set by the upper values of the emission speed of the particles (voltage in his case). It is noted that the spacing between resonators must be large enough to handle the increased angular velocity of the SCW and still match all the strapping impedances of the resonators. The upper limit V2 is reached when the SCW rotates too fast for the resonators to work correctly, or that the SCW has too few electrons in it for the device to meet the minimal current for oscillation. It is noted that increasing the voltage in a standard hot cathode magnetron also increases the current at the same time. Therein, the current can go up in an exponential fashion in filament cathode magnetrons. This same statement is not true in the present magnetron since the isotopic cold cathode is constant current at all voltage levels. See FIG. 32. This is a major difference between the two types of devices.

A. L. Vitter (U.S. Pat. No. 2,589,903) teaches that a magnetron can be tuned by a mechanical means, but the concentric grids thereof are at a plane above that between the cathode and anode block and therefore cannot affect, or can only minimally affect, beta electron or alpha ray emissions from the cathode to the anode.

Vitter also teaches that by adding an external port one can change or pull the frequency of the magnetron. Vitter also indicates a magnetron can be modulated this way, but in fact only the impedance of the anode cavities can be regulated since circuitry and is external to the magnetron proper and only can bias the anode cavities, not the cathode. By using Vitter, one can compensate for frequency pull of isotope emission losses (cold cathode) over time or use isotopes in place of his method for adjusting the capacitance of an external cavity or port. Since the isotope loses power over an isotope's half-life, this is one way to compensate for frequency deviation from power loss in an isotopic cold cathode.

SUMMARY OF THE INVENTION

Beta electrons and alpha-ray particles emitted by radio-isotopic, weak force, by-products of nuclear fission, such as nickel 63, or strontium 90 are used as a power source at a cold cathode of a magnetron system. Such particles include high speed, high energy electrons having a large EMF associated therewith. In the magnetron a radial electrical vector E, between the cathode and anode, interacts with an axial magnetic vector B vector to produce an ExB force vector that rotates the beta electrons or alpha-ray particles about the system axis. These emissions from a cold cathode derive from a small quantity of a radio-isotope within a set range of emission of beta electrons or alpha particles. Both however are not used by the same system. The angular velocity and geometry of a rotating field known as a space charge wheel (SCW) may be modulated by (1) an external RF input which, biases the cavities of an anode block (2) and the use of circumferential biasing grids between the cathode and anode block. In the magnetron is a polar array of anode cavities within the anode block into which the SCW induces LC values which excite the cavities, producing microwave resonance of electrons which may be used as an input to a power port for the direct or indirect generation of AC or DC power.

This invention thus relates to a system for the cost-effective generation of useful electrical energy, the system comprising: a cold cathode having an axially disposed emitter of beta electrons resultant of an electro-weak decay of the quark structure of neutrons of an atomic nucleus of an isotope or alpha particles; an annular anode block having an opposite electrical polarity relative to said cathode, forming between said cathode and anode block a DC radial electrical vector E, said anode block circumferentially disposed in a plane about said cold cathode, and having an interior radius relative to said cathode defining an annular interaction space. An outer periphery of said space defines a polar array of anode cavities in said block, the cavity separated from each other by anode surfaces, each cavity and surface together having an LC equivalent value, each cavity capable of generating a resonant frequency responsive to circumferential motion of said electrons of said SCW past said anode surfaces and entrances to said anode cavities. The system further includes upper and lower magnets, each of opposite polarity, each disposed in respective radial planes, above and below said anode block and cathode, in which opposing surfaces of said upper and lower magnets are in magnetic communication with said interaction space of said anode block, producing an axial DC magnetic vector B there between and axially across said anode block in a direction co-axial with each of said cavities within said anode block in which, in the interaction space, said beta electrons interact with an ExB vector produced by the reflective electrical and magnetic vectors, causing rotation of said electrons to form a spiral rotating electron cloud (SCW) within said annular interaction space and inducing microwave energy at LC resonant frequencies into said anode cavities. The emission velocity of the beta electrons is regulated by concentric grids with the interaction space. Provided is a power port for feeding of collected resonant microwave energy from said cavities of the anode block for conversion into a power output of said system.

It is an object of the invention to provide a safe and cost-effective means of conversion of isotopic electron emissions into useful electric energy.

It is another object to provide a system for use of beta electron neutron decay as a power source for an electric generator or battery.

It is a yet further object to provide a system of the above type having sufficient durability for use without maintenance during a period of at least two years.

A further object is to provide teaching correct information of how to build an isotope powered magnetron that can be used to produce DC or AC power with conversion stage or stages added to the nuclear magnetron. conversion stage or stages in the magnetron as needed. The DC converter stage can be used to power integrated circuit designs or power motor-generator AC devices for utility power.

I show herein the design parameters that can be used relative to standard hot cathode magnetron designs and how the operation of an isotopic magnetron differs therefrom.

The above and yet other objects and advantages will become apparent from the hereinafter set forth Brief Description of the Drawings, Detailed Description of the Invention and Claims appended herewith.

BRIEF DESCRIPTION OF THE DRAWINGS

FIG. 3 is an axial schematic view of a radial cross-section of a magnetron in accordance with an embodiment of the present invention.

FIG. 6 is a view, similar to that of FIG. 3, showing strapping rings between anode blocks.

FIG. 27 is a circuit diagram, alternative to the embodiment of FIG. 25, for the termination of operation of a beta type isotopic magnetron.

FIG. 28 is a circuit diagram showing the stopping or termination of operation of an alpha-type isotopic magnetron, alternative to that shown in FIG. 26.

FIG. 29 shows biasing and grounding connections applicable to a beta type isotopic magnetron.

FIG. 30 shows grounding and biasing connections of an alpha-type isotopic magnetron.

FIG. 36 is a view of another embodiment of FIG. 35 showing the use of different geometries for each cavity.

FIGS. 37 and 38 are fragmentary views of parts of FIG. 36.

DETAILED DESCRIPTION OF THE INVENTION

Figure 1:
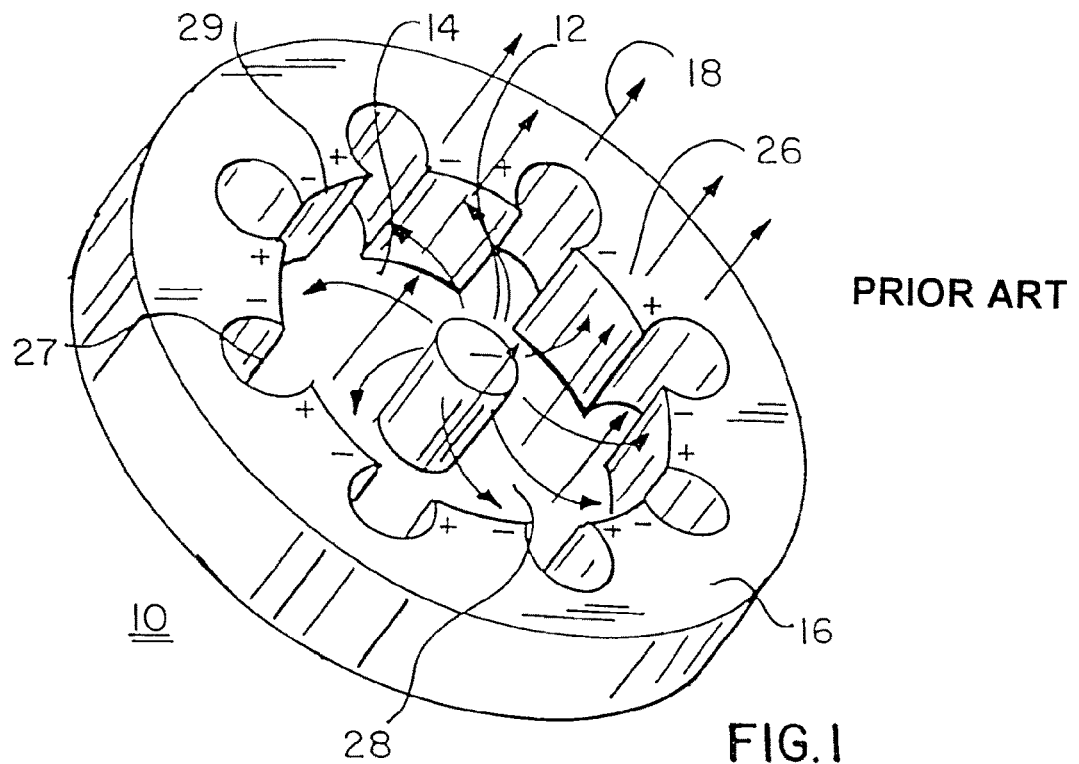
FIG. 1 is a perspective schematic view of an anode block of a conventional magnetron.
Figure 2:
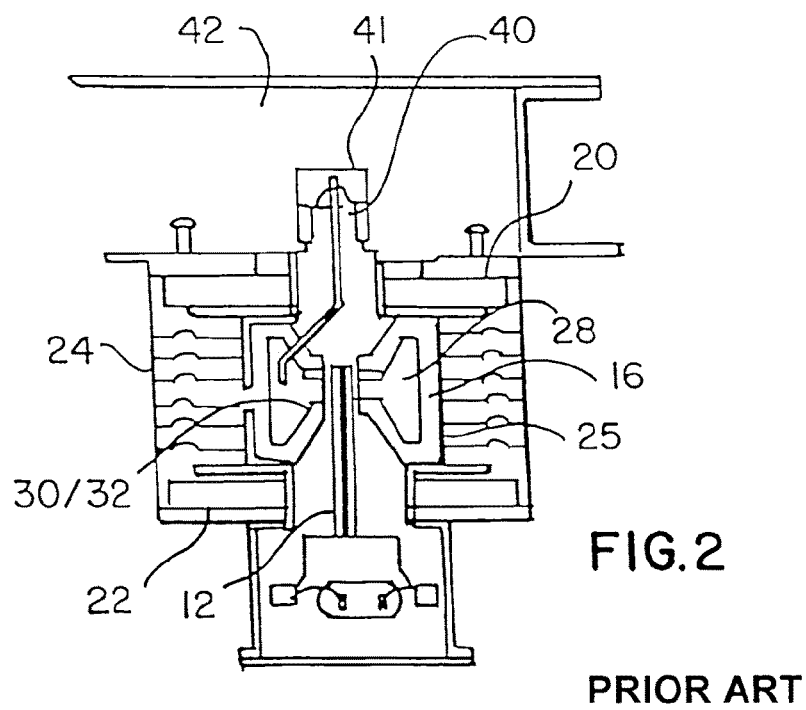
FIG. 2 is a vertical radial cross-sectional view of a conventional magnetron.

With reference to FIG. 1, there is shown one form that an anode and cathode structure of traditional magnetron 10 may take. In this structure, an axially located a cold cathode 12 employs thermionic emission to release electrons 14, which travel outwardly in the direction of anode block 16 which includes anode cavities 27, interaction space 28 and anode poles 29. The otherwise natural radial paths of the electrons are deflected by a linear DC magnetic field 18 which is generated by upper and lower magnets 20 and 22 (see also FIG. 2) of polarity opposite each other. FIG. 2 is a vertical radial cross-sectional view of a typical magnetron which includes said cathode 12 and anode block 16. Cooling fins 24 typically extend integrally outwardly from an outer periphery 25 of the anode block. Also shown in FIG. 2 are interaction space 28, output antenna 40, vacuum power port 41, waveguide 42 and strap rings 30/32 more fully described below.

It may be appreciated that electrons 14 would travel radially outwardly to anode poles 29 were it not for the transverse DC magnetic field 18 which deflects the emitted electrons to the left because the (E×B) cross-vector resultant from the interaction of the radial electric field of electrons with the transverse DC magnetic field 18. Thus, electrons 14 tend to sweep around annular interaction space 28 between the cathode 12 and poles 29 of the anode block 16. This circular motion is shown in FIG. 3 which also illustrates the radial geometry which an anode block 116 of a fin or stub type magnetron 100 may take. Therein, anode cavities 127 are formed between anode stubs 126, at the end of which are poles 129. These cavities are trapezoidal as opposed to the cavities 27 of the magnetron 10 (see FIG. 1) which are semi-circular in radial cross-section. FIG. 3 also shows rotating electron cloud pattern 128 and a RF port 44, later described.

Figure 4:
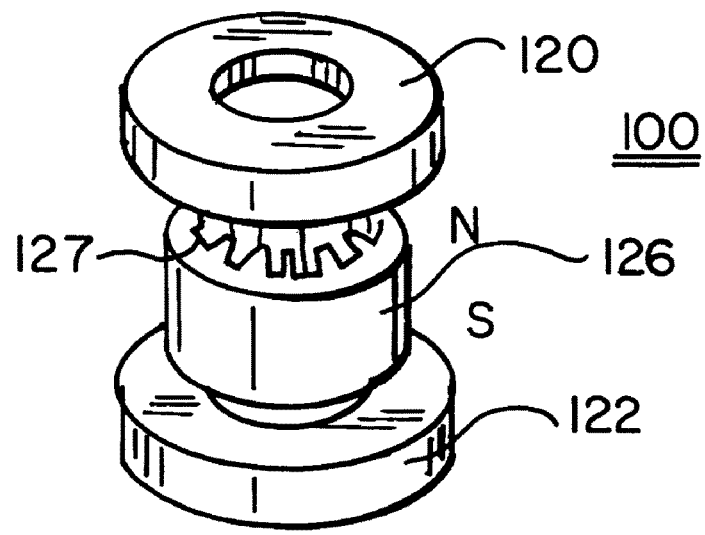
FIG. 4 is an exploded view of portions of the magnetron of FIG. 3.
Figure 5:
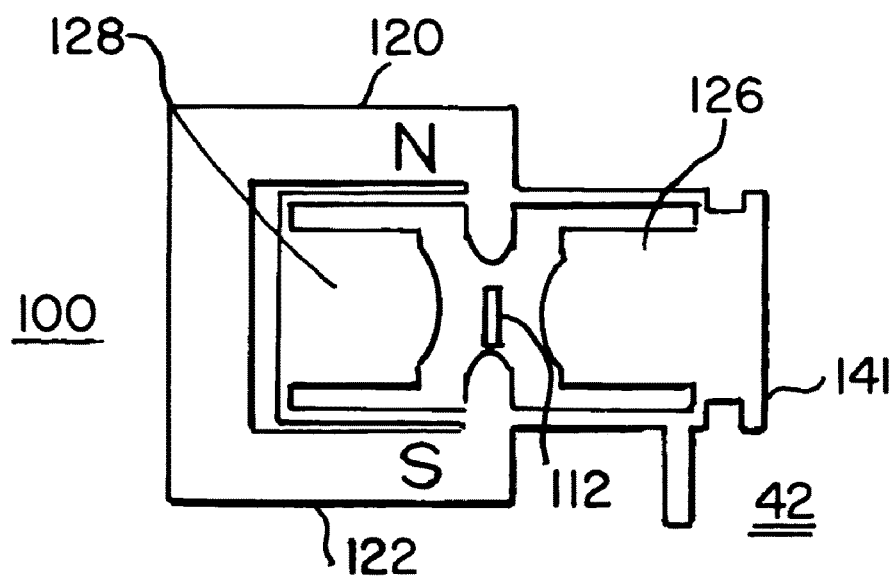
FIG. 5 is a partial vertical cross-sectional view of the magnetron of FIG. 3 and its waveguide interface.

In the present invention, there is used a radio-isotope cathode (cold cathode) 112 which emits high energy electrons 15. An exploded view of magnetron 100 is shown in FIG. 4, which also shows DC magnets 120 and 122, and cavities 127. FIG. 5 is a vertical fragmentary radial view of the magnetron of FIG. 3, showing interaction space 128, stubs 126, DC magnets 120 and 122, vacuum RF port 141, cathode 112 and waveguide 42. In FIG. 6 is shown, in radial cross-sectional view, an actual magnetron of the type shown schematically in FIG. 3. Therein may be seen anode block 116, anode fins or stubs 126, trapezoidal anode cavities 127, the isotopic cathode 112, anode poles 129 and two sets of shorting straps 130 and 132, the function of which is explained below. Also shown in FIG. 6 is interaction space 128 between cathode 112, and anode stubs 126 and poles 129.

Figure 16:
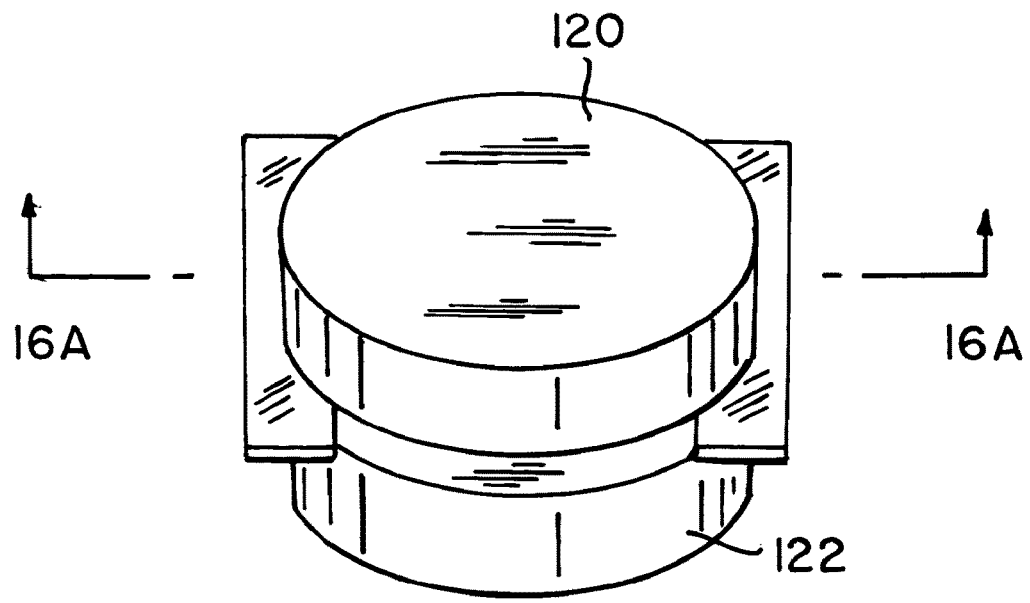
FIG. 16 is an assembly view of FIG. 4, however showing the use of a dielectric offset between the upper and lower magnets.
Figure 16A:
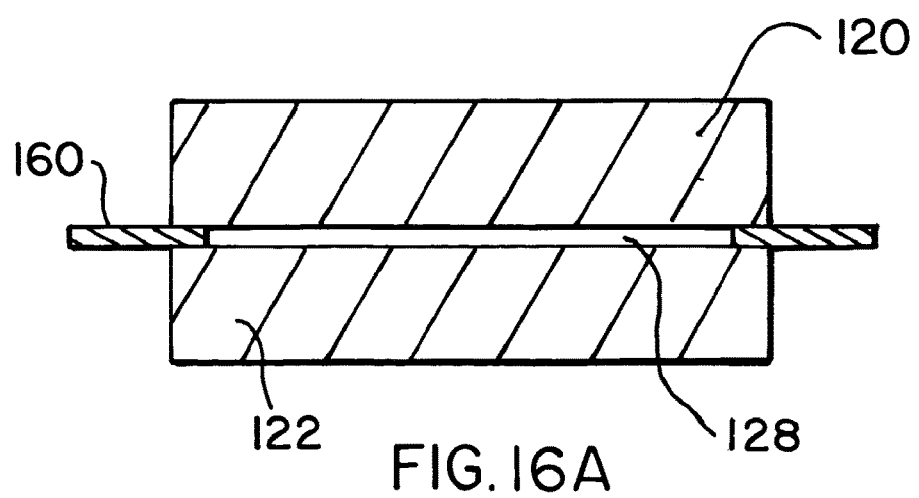
FIG. 16A is a vertical cross-sectional view taken along Line 16A-16A of FIG. 16.

In FIG. 16 is shown an assembly view of the magnetron 100 of FIG. 4. Shown therein are strips 160 of a non-conductive or dielectric material such as a polycarbonate, silicone, or the like. The structure thereof may be more fully appreciated with reference to the vertical cross-sectional view of FIG. 16A-16A in which interaction space 128 may also be seen (see also FIGS. 5 and 10). It may, from FIG. 16A, be appreciated that, in a given embodiment, the axial height of interaction space 128 may be very narrow while in other embodiments, such as those shown in FIGS. 4 and 5, it may be closer in dimension to the radius of the interaction space.

Figure 7:
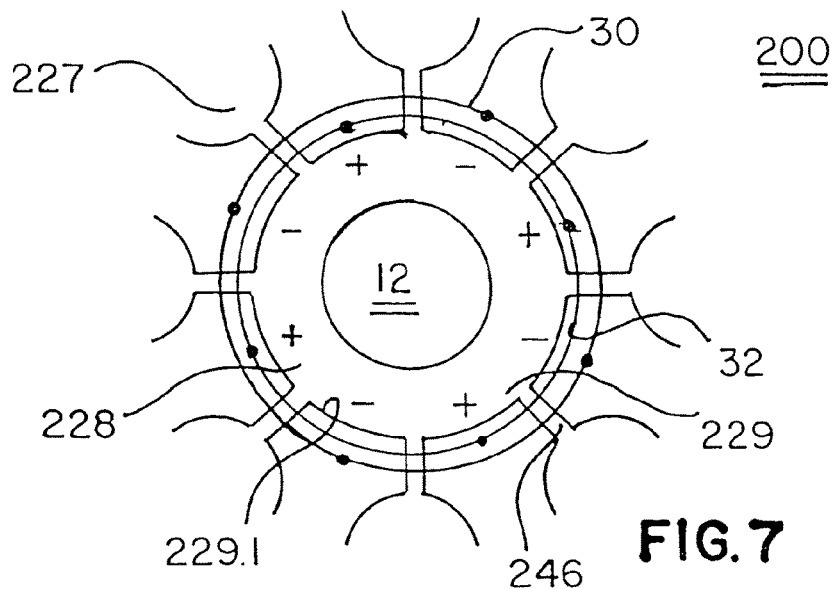
FIG. 7 is an axial fragmentary view of a radial cross-section of a hole-and-slot type magnetron.

Strapping 30/32 is shown in more detail in the hole-and-slot magnetron 200 shown in FIG. 7. As may be noted, positive poles 229 are tied to each other by inner strap 32 while negative poles 229.1 are tied to each other by strap 30. Strapping of respective pole pairs assures a desired phase relation of respective spokes 147 of the SCW 131 (see FIGS. 10 and 11) and uniformity of amplitude of each spoke. This facilitates the combining the power output of each cavity. Each strap 30 and 32 may then be connected to a power port output of the system.

The effect of the rotation of electrons 15 is shown in the views of FIGS. 8 to 11. More particularly, the isotope input to the magnetron 100/200 is applied at center cathode 112 from which high speed (0.75 c), high energy electrons 15 are released by neutron decay from the radioisotope. Nickel 63 may be employed because of its particular property of high rate of release of beta ray electrons, safety and reasonable cost. The inventive system thus employs a cold cathode requiring no external heat or power source. As noted above, beta rays are produced by the radioactive decay of neutrons of certain naturally occurring elements but, particularly, by man-made by-products of fission in nuclear power plants in the and production of plutonium. Nickel 63 gives off no alpha or gamma radiation, so that its use does not necessitate thick lead shielding or the like for safety purposes or alpha-specific shielding. As noted in the Background of the Invention, the magnetic energy given off by beta electrons possesses energy several orders of magnitude greater than either the kinetic energy or the direct electric charge of the electron, and far greater than that of electrons resultant of the thermionic emission of prior art magnetron cathodes.

Figure 8:
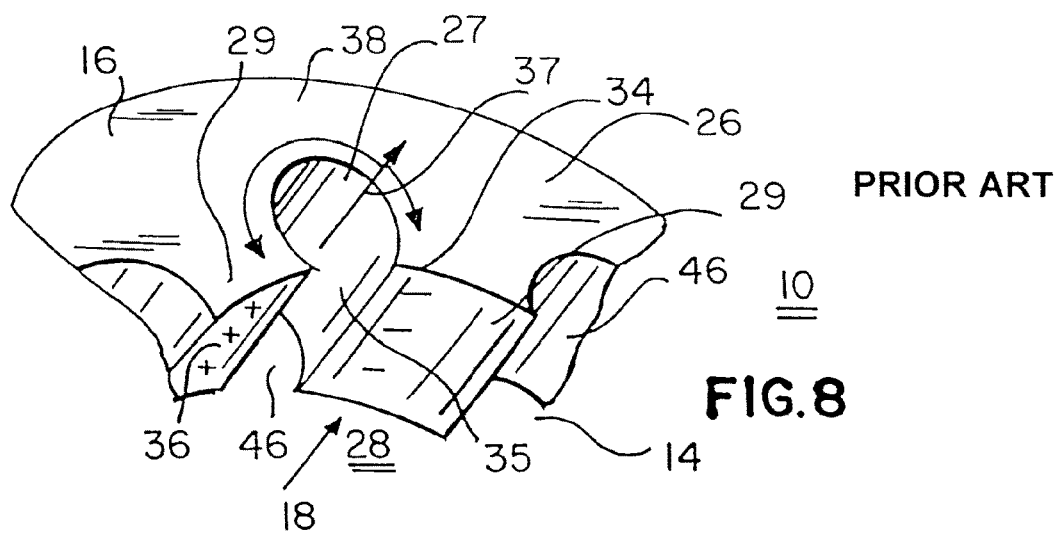
FIG. 8 is a polar segment of the view of FIG. 1.
Figure 9:
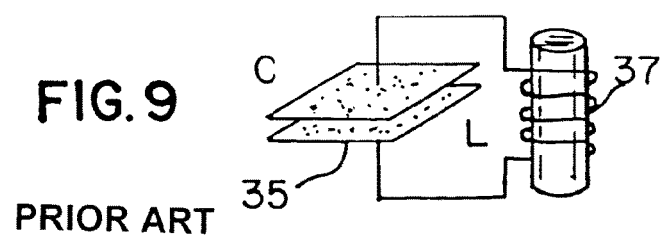
FIG. 9 is a view of an equivalent LC resonant circuit of the structure of FIGS. 1 and 8.

It is to be appreciated that any moving electrically charged particle, e.g., an electron, will behave like a current and thus yield a symmetric magnetic field in which energy is stored and thus carried by the particle. Absorption of such a charged particle causes its magnetic field to collapse the energy of which is considerable, as above noted. As set forth in U.S. Pat. No. 4,845,433 to Brown (see Background of the Invention above) an LC resonant tank circuit oscillation at a self-resonant frequency uses energy contributed by the beta voltaic effect, providing a resonant nuclear battery to convert beta electron energy into electricity. The within invention however employs the unique function of LC resonant microwave cavities of a magnetron which are more efficient and durable than the LC resonant tank circuit taught by Brown. This may be seen with reference to the description which follows:

In FIG. 8 is shown an enlarged fragmentary view of the magnetron 10 of FIG. 1. Therein are shown anode block 16, anode cavities 27, anode stubs 26, and anode poles 29. Some of the electrons 15 emitted from the isotope cathode eventually reach anode pole 29 or become a part of a whirling cloud 131/231 of electrons, within the interaction space 128/228 (see FIGS. 10-11), having both radial and polar velocity components. In most cases, however, the polar component of momentum (produced by the above-referenced E×B vector) will predominate, causing the counter-clockwise electron rotation shown in FIGS. 3, 10 and 11. With further reference to FIG. 8, electrons 15 will arrive from the cathode at a negatively charged region 34 of the anode pole 29 and, in so doing, will tend to "pump" the natural resonance frequency of the cavities 27 in two ways: Firstly, by forming a virtual capacitor across slot 46 between said negatively charged region 34 and a positively charged region 36 (which is induced upon the opposing side of the next anode pole 29). Opposing charge regions 34 and 36 at opposite sides of slots 46 of each anode cavity 27 thus yield a capacitive effect 35. (See FIG. 8) Concurrently, the difference in charge between regions 34 and 36 produces a current flow 38 around cavity 27 and, because of the geometry of this current flow, an inductive effect 37 transverse to cavity 27 is produced. Resultantly, the sweep/rotation of electron field 31 within interaction space 28 causes each cavity 27 to exhibit a resonance which is analogous to that of parallel resonant circuit, as shown in FIG. 9. Therein, the resonant frequency is expressed by the formula:

In the process of electron rotation, work is done on the electron charges because the axial magnetic field 18 of magnets 20 and 22 exerts force on electrons 15 which is perpendicular to their initial radial motion, thus causing them to be swept in the above noted annular motion by the (E×B) vector. In this manner, work is done upon the charges during their rotation. As the electrons sweep toward regions 34 of excess negative charge (see FIG. 8), a part of that charge is pushed around cavity 27, imparting both said inductive effect 37 and an oscillation which arises at the above-described natural frequency of the cavity. The driven oscillation of the charges past the anode cavities 27, regardless of their geometry, generates radiation of electromagnetic waves, typically in the microwave range, which are the output of every magnetron.

Figure 10:
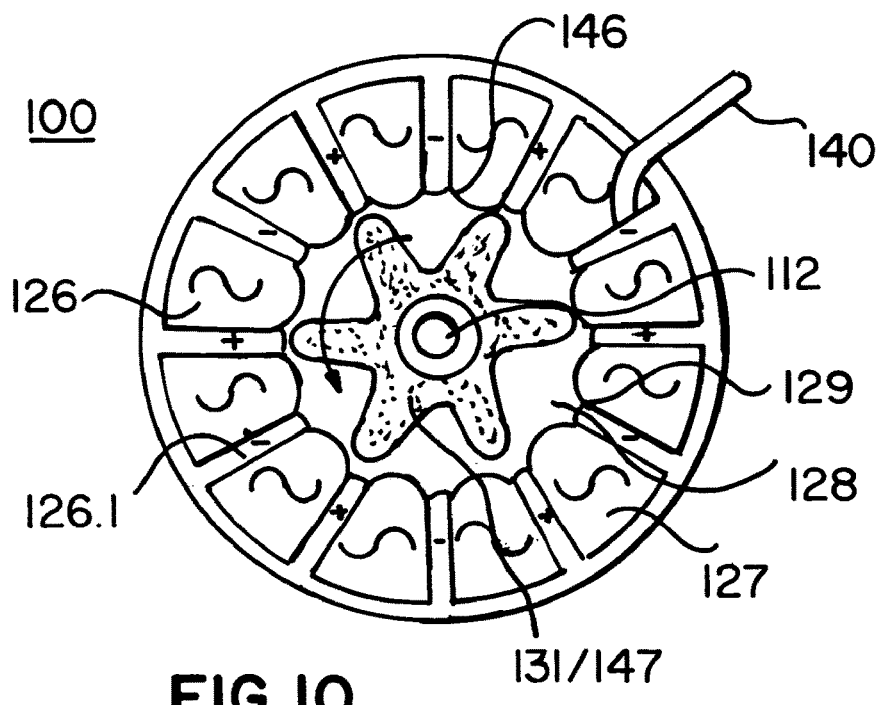
FIG. 10 is a view, similar to that of FIGS. 3 and 6, also showing a rotating electron cloud pattern in the interaction space of the stub-type magnetron of FIGS. 3-6.

In FIGS. 2, 3 and 10 are shown antennae 40/140 which provide said waves, thru power port 41/141, to one or more waveguides 42 as described below.

Figure 11:
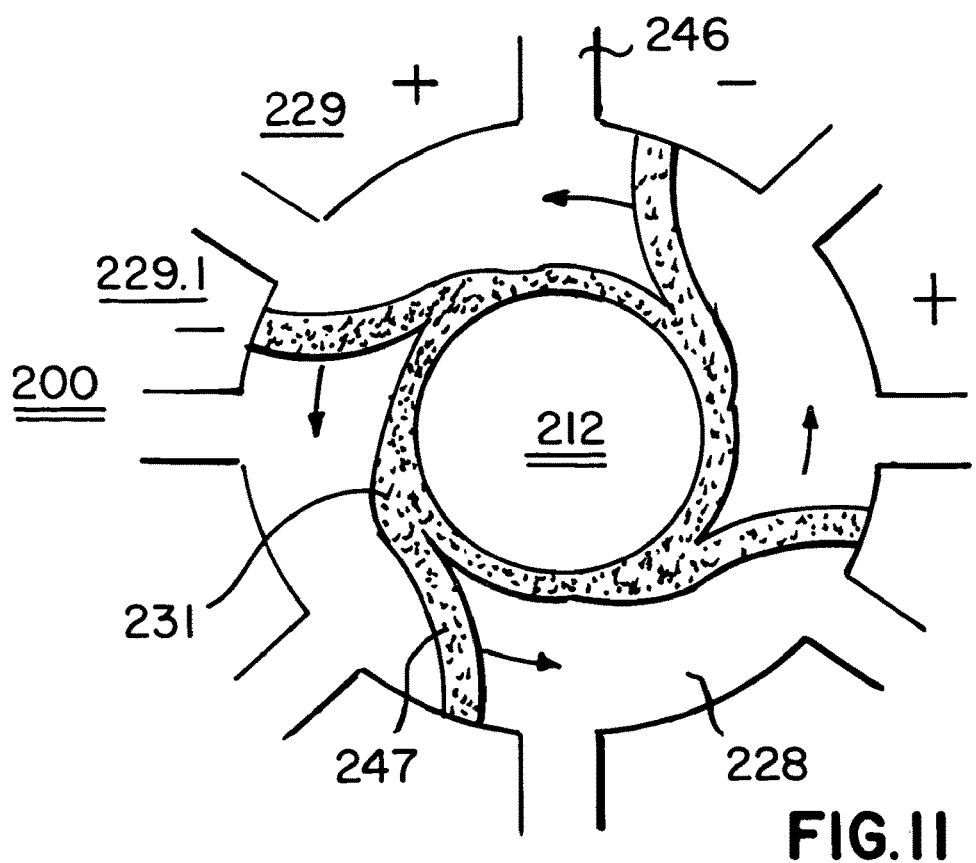
FIG. 11 is a view, similar to that of FIG. 10, but relative to a slot magnetron of the type of FIG. 7.

FIGS. 10-11 show counter clockwise electron wheels 131/231 (and "SCW") of whirling electrons 15 as influenced by the above-described beta voltaic effect of isotope cathode 112 and the DC magnetic field between magnets 120 and 122. This forms a rotating pattern which, due to a property of the resonance cavities known as moding, produces a pattern which resembles spokes 147 of the SCW. The interaction of this rotating space-charge pattern with the configuration of the surfaces of anode poles and anode cavities produces a specific alternating current flow in the cavities of the anode. That is, as a spoke 147 of spinning electron pattern (SCW) 131/231 approaches an anode stub 126 (see FIGS. 3, 5, 6 10, and 11) a positive (+) charge is induced in that stub 126, or in pole 229 in FIGS. 7 and 11. As the electrons pass, the positive charge diminishes in one stub, a negative charge is induced in the next stub 126.1 or pole 229.1. (See FIGS. 10-11). Current is induced in the cavity because of the physical structure of the cavity 127, as above described with reference to FIG. 8, producing the high Q resonant inductive-capacitive (LC) circuit of FIG. 9 in each cavity. The parallel relationship between the and C parameters of the resonant cavities is secured through the so-called even and odd strapping 130 and 132 (see FIGS. 6 and 7) of alternate anode stubs 126 of the magnetron. In other words, the formula for resonant frequency above set forth with reference to FIG. 9 indicates that, in a given application, resonant frequency may be modified through (1) changes in the strapping, relationship of the resonant cavities of the system and (2) changes in the geometry of the cavities 27/127 or their gaps 46/146, (3) rate of rotation of the field 131 and its shape (see FIGS. 10-11) and (4) energy density of the field. For example, cavities 27 of FIGS. 1 and 8 will have a smaller capacitance across its gap than will the cavities of the magnetron 100 shown in FIGS. 3 and 10. Similarly, so-called hole-and-slot magnetron 200 of the type shown in FIGS. 7 and 11 will have a yet smaller capacitance than magnetron 10 because of the minimal width of the gap 246 between anode poles 229. By increasing the diameter or surface area of the cavities 27/127/227, the inductive effect will increase. In other words, a rotating magnetic pattern 131/231 of greatly increased energy, as will occur in the use of isotopic cathode 112, would require that an effective inductance and capacitance of the magnetron be provided in a relationship inverse to each other if one wished to obtain the same resonant frequency output into waveguides 42 as would occur in a conventional microwave. This might be essential if one wished to obtain the same 2.455 MHz frequency output which is efficient in the evaporation of water. Also, the strength of DC magnets 30/32 would also require increase, as might the radius of the interaction space 28/128, due to the high energy of beta electron 15.

Figure 13:
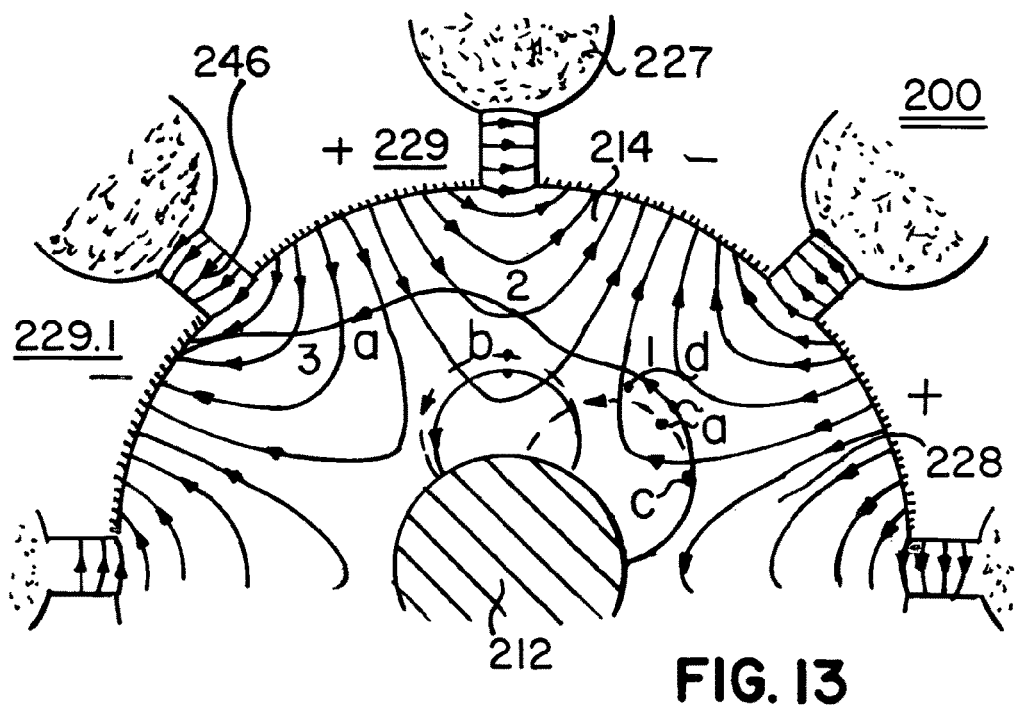
FIG. 13 is a schematic partial fragmentary view of the structure of FIGS. 11 and 12, showing the effect of an RF input upon the electron cloud pattern in a magnetron.

An added significant factor in the behavior of rotating charge pattern (SCW) 131/231 (see FIGS. 10 and 11) is the effect of the introduction of an RF field into interaction space 28/128, from RF port 44. (See FIG. 3). In fact, in the absence of an introduced external RF field, most electrons would either congregate at an anode pole 229.1 as is shown by the path of electron (a) in FIG. 13 or would quickly return to the cathode 212 as is shown by the path of electrons (b) in FIG. 13. However, the presence of the RF field naturally modifies these paths to facilitate the shape and rate of rotation of space-charged wheel pattern 131/231 within the interaction space 128/228. (See FIGS. 10-11). In FIG. 13, it is noted that electron (a) spends much more time in the RF field than do electrons (b). Electrons (a) are thus retarded and, therefore, the force of the DC magnetic field on then is diminished; as a result, they can now move closer to the anode pole 229. Under proper conditions, by the time electrons (a) arrive from point 1 at point 2, the RF field has reversed polarity, meaning electrons (a) will again be in a position to give energy to the RF field by being retarded by it. The force on electron (a) diminishes once more, and another RF interaction of this type occurs, this time at point 3, provided that at all times the RF field reverses polarity polar each time these electrons arrives at a suitable interaction position. In this manner, such "favored" electrons spend considerable time in the interaction space 228, and are capable of orbiting the cold cathode 212 several times before eventually arriving at an anode pole 229.

Electrons (b) undergo a totally different process. They are immediately accelerated by the RF field and, therefore, the force exerted upon them by the DC magnetic field increases. Electrons (b) thus return to the cathode even sooner than they would have in the absence of the RF field. They thus spend a much shorter time in the interaction space than electron (a). Although their interaction with the RF field takes as much energy from it as was supplied by electrons (a), there are far fewer interactions of the (b) type because these electrons are returned to the cathode after one, or possibly two, RF interactions. On the other hand, electrons (a) give up energy repeatedly. Therefore, more energy is given to the RF field than is taken from it, so that oscillations in the cavities 127/227 are sustained. The practical effect of electrons (b) is that they return to the cathode and tend to heat it.

Electrons in a magnetron also tend to bunch, this known as the phase-focusing effect, without which favored electrons (a) would fall behind the phase change of the RF field across the anode gaps 246 or slots 146 (see FIG. 10), since such electrons are retarded at each interaction with the RF field. Electrons (c) (see FIG. 13) contribute some energy to the RF field, but do not give up as much as electrons (a) because the tangential component of the field is not as strong at that point. As a result, these electrons are initially less useful than electrons (a). Electrons (c) encounter not only a diminished tangential RF field but also a component of the radial RF field, as shown in FIGS. 11 and 13. This has the effect of accelerating the electron radially outwardly, forming arms 247 of pattern (SCW) 231 shown in FIG. 11. Immediately after this happens, the DC magnetic field exerts a stronger force on electrons (c) tending to bounce them back to the cathode 112 and also accelerating them in a counterclockwise direction. This, in turn, gives this electrons (c) a good chance of catching up with electrons (a). In a similar manner, electrons (d) (see FIG. 13) are retarded tangentially by the DC magnetic field and will therefore be overtaken by the favored electrons (a). Thus a bunching of electrons takes shape.

If an electron slips backward or forward, it will quickly be returned to a correct position with respect to the RF field, by the phase-focusing effect above described. FIG. 11 shows the wheel-spokes or arms 247 in the cavity magnetron. In the case shown, these arms rotate counterclockwise with the correct velocity to keep up with the RF phase changes between adjoining anode poles 229 and 229.1, so that a continued interchange of energy takes place, with the RF field receiving much more than it gives. As above noted, the RF field changes polarity and, thus favored electrons (a), by the time they arrive opposite the next gap or slot 246, see a positive anode pole 229 above and to the right, and see negative anode pole 229.1 to the left.

Figure 14:
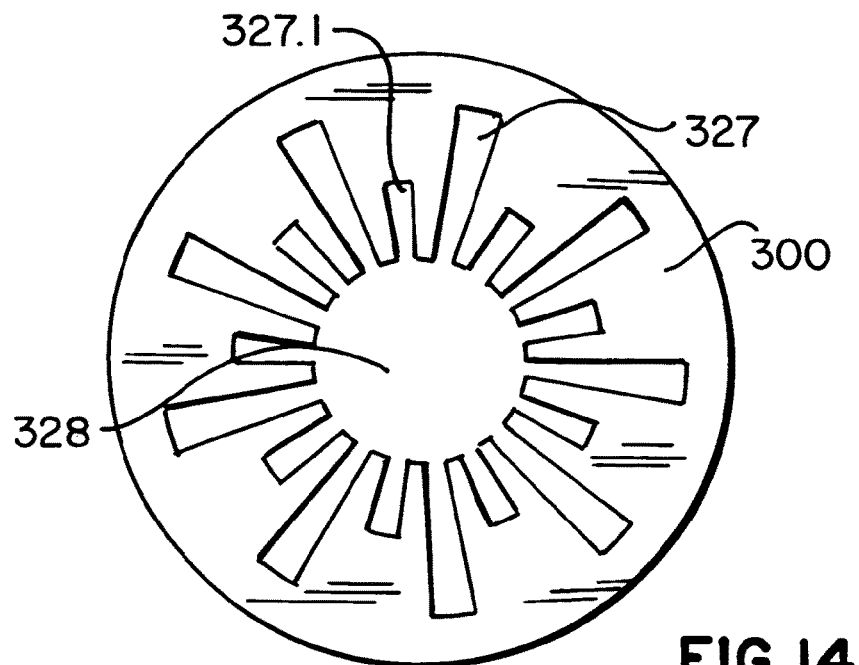
FIG. 14 is an axial view of a radial cross-section of a rising-sun type anode block.

Should one wish to avoid the use of strapping or shorting rings 30/130 and 32/132 above described with reference to FIGS. 6 and 7, one may employ an anode block 300, shown in FIG. 14, in which alternating cavities 327 and 327.1 possess different radial dimensions. Therein larger cavities 327 are alternated with smaller cavities 327.1 to ensure that a suitable RF field is maintained in interaction space 328 and to avoid a phenomenon known as mode jumping. These differences in geometry between cavities 327 and 327.1 result in differences in resonant frequency that will be useful in tuning the magnetron of the present invention.

Another method of modulating the behavior of the magnetron entails alternating a DC voltage on the anode block to affect the capacitative and inductive values of the cavities. Also a technique, known as frequency pushing, may be used to affect the orbital velocity of the rotating electron cloud above-described with reference to FIGS. 10 and 11. This can be useful in adjusting the resonant frequency emitted by the cavities since change in the orbital velocity of the electron cloud will change the LC values of the resonant cavities. Thus a variable RF input will e useful in tuning the magnetron of the invention.

Figure 12:
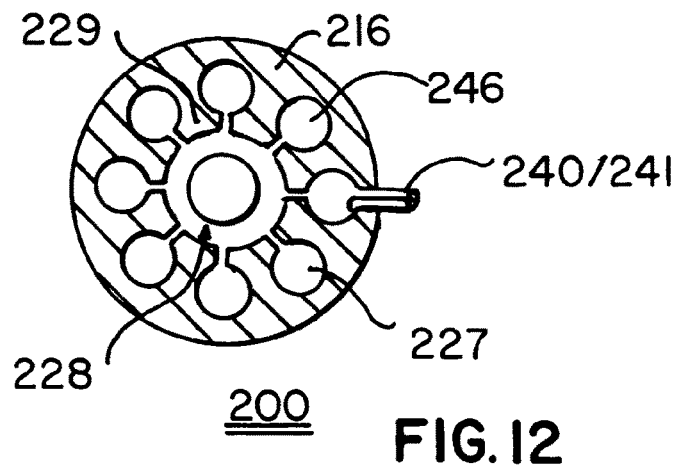
FIG. 12 is an axial view of the radial cross-section of the magnetron of FIG. 7, and including the power exit port thereof.
Figure 15:
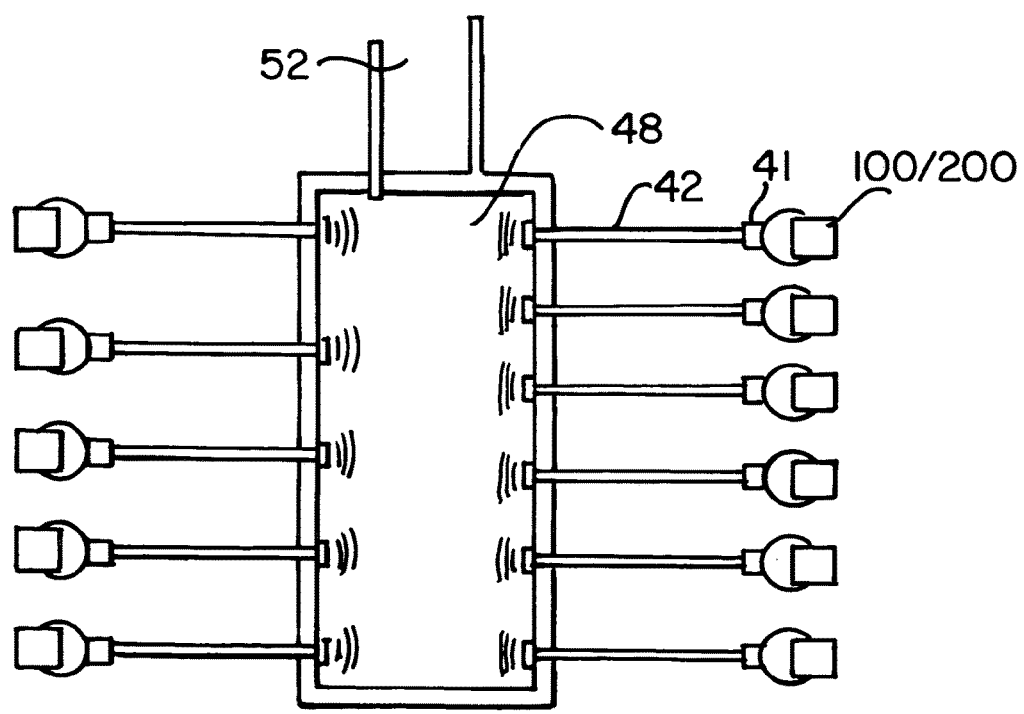
FIG. 15 is a systems view of the present invention.

As noted in FIGS. 2, 5, and 12, an antenna 40 provides electromagnetic communication from said strapping 30/32 of said cavities 27 into said power port 41 which feeds the energy resultant of excited fins/stubs 26/126 into waveguide 42. This microwave energy of the cavities is channeled through a plurality of waveguides 42 (see FIG. 15), one for each magnetron 10, employed in the present system. In one application, waveguides 42 provide the energy to a boiler 48 at 2.455 MHz which is highly efficient frequency for the heating and evaporation of water or liquid 52. This may then be used to power a turbine generator. It is to be noted that fluids other than water, such as a plasma, may be advantageously used in boiler 48, which may be suitable where more compact methods of power generation are required. Alternatively, a carbon load may be constructed, in lieu of boiler 48, to provide a concentration of heat from waveguides 42 to a local hot spot.

Said anode cavities in combination with said waveguides 42 are highly efficient conductors of energy and are capable of transporting wattage high enough to constitute a substitute for fossil fuel and to create a steam input to a turbine generator having an advantageous power-to-weight and power-to-cost ratios. It is also noted that fluids other than air may be used within waveguides 42 where the chemistry of such fluids is more advantageous for transport of energy. Alternatively, and most likely, said waveguides, as well as the above-described magnetrons themselves, will be vacuum sealed to minimize molecular interference with the above-described use of the beta emitting radio-isotope as the cathode of the magnetron.

It has been determined that nickel 63 or strontium 90, where available, constitutes the best and most efficient fuel for use in the magnetron in a commercial application, this due to the fact that it produces a high volume of very high speed electrons. Subject to the refinement of the various operating parameters of the magnetron, the system utilizes beta ray electrons and the substantial, historically untapped energy of the beta voltaic effect associated with the magnetic fields of such electrons. Where nickel 63 is unavailable, many other beta-emitting isotopes exist. See U.S. Pat. No. 5,825,839, referenced above, to Baskis. However, most of such other isotopes also emit alpha and/or gamma radiation. Therein, one may selectively shield or filter out the undesired radiation to leave emission only of the desired beta ray electrons discussed above. Therefore, either method, whether entailing the direct use of isotopes such as nickel 63, strontium 90 or iron 55, or the shielding out of other rays from numerous other isotopes, may be employed to achieve high volume, high speed beta electron emission. It is noted that the U.S. Department of Energy, in a project known as the Archimedes Separation Process, has developed a method for the separation, into discrete isotopes, of the constituent by-products of plutonium production. Using this process, nickel 63 and other isotopes may be cost-effectively extracted from rods of fission reactors and waste associated with production of plutonium. This technology is subject to U.S. Pat. Nos. 6,096,220 and 6,235,202 among others.

As may be appreciated, many isotopes which are by-products of nuclear fission have been stored, without any viable commercial use, for many years. However, as above noted, the magnetic separation process developed by the U.S. Department of Energy has resulted in a method of separation, into discreet isotopes, of a constituent isotopes of plutonium production. Accordingly, large stock piles of many discreet isotopes exist e.g., nickel 63, and more material may be cost-effectively obtained through this process.

It is to be appreciated that said waveguides 42, as in the case of said anode cavities 27, may assume various different geometries, depending upon application. Therein, frequency outputs of over 300 GHz have been obtained.

The invention herein issues addresses deficiencies of the prior art important to isotopic fuel used in my nuclear magnetron, including design requirements for the isotopic cathode necessary to enable its use in the present system.

By the year 2000, after many years of production of microwave oven magnetrons, cathode sizes had expanded many times. The modern magnetron can now house large amounts of isotope because it no longer uses point contact type magnetrons for high power applications. Thus making a functional type isotope powered magnetron is now possible due to such improvements in cathode design of otherwise conventional microwave systems.

In old style point contact magnetrons, small points of metal were used over the filament area limiting the cathodes to such small areas. By comparison, the modern non-point, contact magnetrons use doughnut magnets (see FIG. 4) as part of the magnetron which and allow for much larger cathode areas. As such, a gram or more of isotope could easily be used in non-point, contact isotope magnetron using other aspects of current designs, as is discussed below.

Power Calculation

The calculation of isotope power can be esoteric. The following provides, to of those skill in the art, a practical approach to deriving power from an isotope 812. Since a coulomb is approximately equal to about $6.24 \times 10^{18}$ elementary charges, one ampere is approximately equivalent to about $6.24 \times 10^{18}$ elementary charges, such as electrons, moving past a boundary in one second. This statement only applies to beta isotopes.

Figure 40:
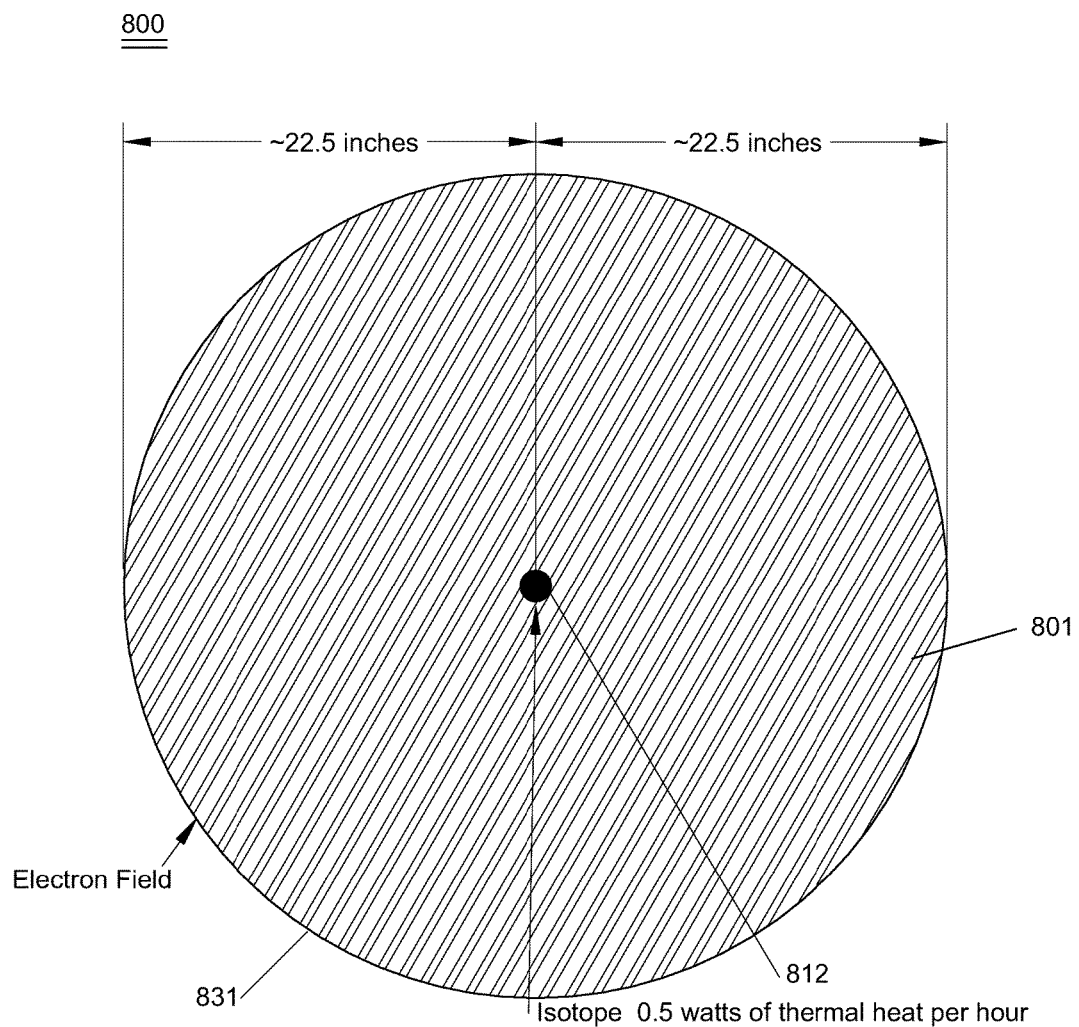
FIG. 40 is a schematic diagram useful in calculating the power in a given mass of a particular isotope.

An example of a Sr-90 isotope calculation of power for beta emission electrons 801 appears in FIG. 40. This isotope has $5.106\times10$ to the $12^{th}$ power of elementary charges coming from it per second. We take $6.24\times1018/5.106\times10$ to the $12^{th}$ power=about 1,222,387. That is about $1/1,222,387$ of an amp=about $8.18\times10$ to the $-7^{th}$ power of current in 1 second. To find power we know that the particles are averaged at 300,000 electron volts. 300,000 "volts"$\times8.18\times10$ to the $-7^{th}$ power "amps"=about 0.245 watts per second. volts×amps=power in watts per second.

To change this to watt-hours, one must multiply by 3600 (60 seconds in a minute and 60 minutes in an hour). In the area of FIG. 40 electrical field 831 of the isotope produces about 0.245 watts per second. Changing this into a watt hour is 3600×0.245 watts=about 883.5 watts per hour.

If we use the peak emission 540,000 volts the power in the isotope increases to about 1590.33 watts per hour. Note the large difference in watts per hour as the voltage range changes. Using one gram of isotope Sr-90 produces about 883.5 to about 1590.3 watts per hour of power for our nuclear magnetron, depending on how the isotopic cold cathode is designed and built. From this one can see that the energy around the isotope is far more than just the heat produced by the isotope alone.

It should also be pointed out that in an isotopic magnetron a cold cathode acts as a constant current source. See FIG. 32. Standard magnetrons with hot cathodes are not current limiting and need some kind of current limiting added to them in the form of a pulse network driver or power supply current limiting. Constant current from an isotope is an added feature of isotopic magnetrons. Even though the isotope may vary in output in a general sense this still acts like constant current from an engineering point of view.

We can see this current effect from how the equation above is expressed in "coulombs per second" versus how the isotope is expressed in limited "charges per second". That is, the isotope behaves as a constant current source in a relative manner. This concept can be hard to grasp in electrical engineering terms and is not apparent. By understanding that the isotope acts as a constant current, isotopic magnetron design exhibits a smaller range of current fluxation and one need not be concerned with current limiting in most cases of the design. This develops the parameters of isotopes for cold cathodes that are needed for calculations in the inventive system.

Also, isotopes by nature, may not be conductive or they may also act as an insulator even though they emit electrons. Isotopes also can act as a semiconductor. This may be a major issue with the design if it needs a power supply to start the operation of the isotope device. Again, designing an isotopic magnetron is not like building a standard magnetron using a known filament made of tungsten with a vacuum about it. One should not think of a cold cathode as a hot cathode since there are major differences between them. Tungston cathodes (hot cathodes) have a very low resistance whereas cold cathodes can exhibit anything from a low resistance to an insulator level of resistance which needs to be taken into account when designing an isotopic magnetron device. Counterintuitively, the fact that an isotopic cold cathode may have a low resistance does not allow extra current flow therein as in hot cathode system.

The Bremsstrahlung effect is minimal in this device since the resonators of a magnetron convert the electron energy to microwave energy before most of the electrons hit the anode blocks or fall back to the concentric grids. See FIGS. 17-20. Only the cold cathode itself will have an high amount of radiation coming from it in the form of X-rays or gamma rays, meaning that appropriate shielding is necessary. Some of this occurs from fall back electrons from the SCW 131/231 (see FIGS. 10-11) to the cold cathode isotope 112/212. Some of this fall back can be mitigated with concentric grids in the system. See FIGS. 18 and 22.

Power Conversion for an Isotopic Magnetron

This invention provides power from high voltage isotopes and is not considered to be a frequency stable device for use in normal communication circuits such as receiver oscillators. However one might, under certain circumstances, be able to use it for this. Smith (U.S. Pat. No. 5,280,218) shows us why lack of noise is so important in a communications magnetron and how to reduce that noise from a hot theromic cathode. However, isotope noise does not diminish the production of power or RF output in an isotopic magnetron or the efficiency of the invention device.

Figure 23:
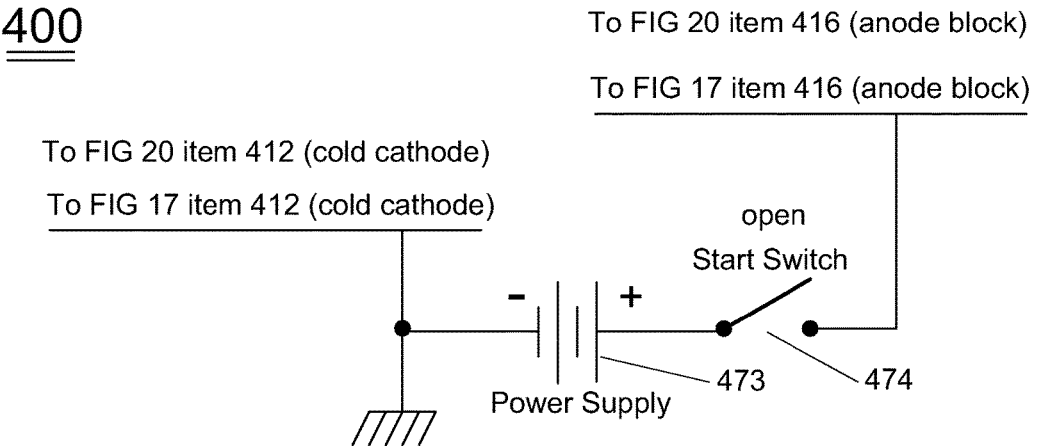
FIG. 23 is a schematic circuit showing a power supply for use in the starting a beta type isotopic magnetron.
Figure 24:
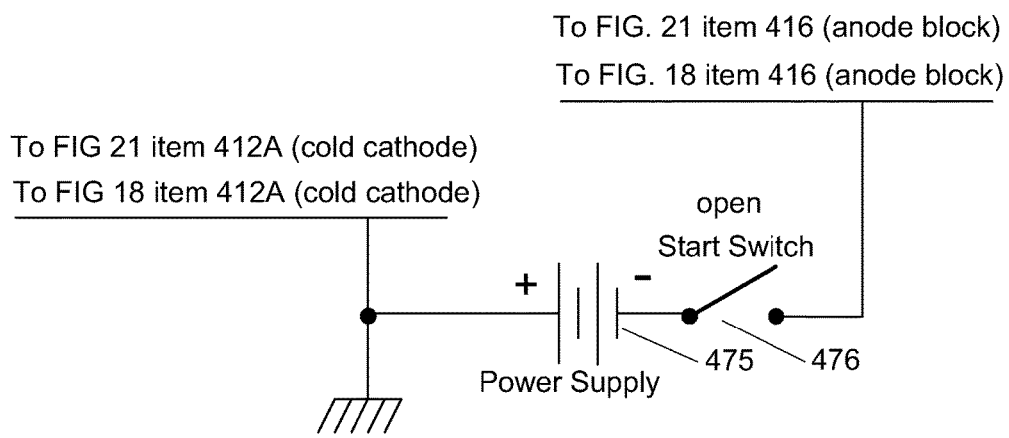
FIG. 24 is an electrical schematic showing the use of the power supply for the starting of an alpha type isotopic magnetron.
Figure 25:
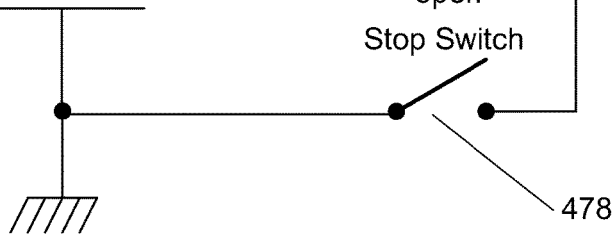
FIG. 25 is a schematic view of a circuit employed in the stopping or termination of operation of a beta type isotopic magnetron.
Figure 26:
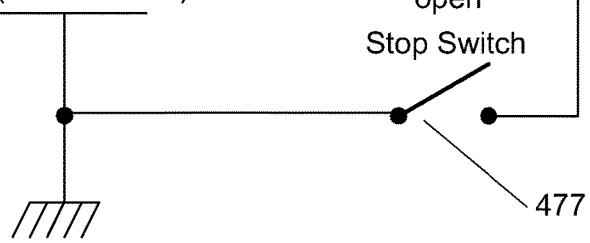
FIG. 26 is a view, similar to FIG. 25, showing the applicable electrical connections between the grids and cold cathode, on the one hand, and the anode block, on the other hand, for the stopping or termination of operation of an alpha type isotopic magnetron.

For simplicity, I use the terms anode or anode block and cathode or cold cathode, but, in most cases, no power supply is needed to actually run the device. That is, the RF signal is not needed to operate the magnetron. Like with all magnetrons, there are many electrical configurations that can control the energy flow from the isotope in starting and/or stopping the flow of particles or controlling the particle speed if needed. One can see in FIG. 23 that a magnetron with a beta (electron) emitter 412 uses a power supply 473 to start the device's operation. In FIG. 24 one can see that a power supply 475 of opposite polarity is provided for a magnetron with alpha emitter 412A. Respective switches 473/476 are provided.

I note that the geometric trajectory of electrons of a cold cathode magnetron is different from that of a hot cathode magnetron and this must be considered when designing the device. See FIGS. 7-21. That is, hot cathode magnetrons use a "linear acceleration" or thermionic electron thus having an elongated arc type of path upon emission. As noted above, cold cathode magnetrons do not have "linear accelerated" electrons that this change the geometry of the electron being ejected from the cold cathode causing the invention (isotopic magnetron) to be designed different than standard hot cathode magnetrons. The same design principles can be used taking into account the arc differences in the ejected electrons from a cold cathode versus a hot cathode. This may seem minor at first but in fact it would cause the isotopic magnetron not to work correctly if not considered.

From a technical point of view the terms anode and cathode come from tubes with a hot cathode or filament. One also has the word anode in a tube that implies that it will have some type of voltage impressed upon it.

In the case of an isotopic magnetron, the anode may or may not have a voltage on it. And in the case of the cathode there may or may not be voltage impressed on it either. The isotopic magnetron is in fact a very different type of device from a standard cathode filament magnetron. In the inventive device current flow can only be measured from the particles coming from the isotope. An amp meter connected to the isotope and anode of the device would in fact produce an incorrect result. Herein lies a major difference between regular magnetrons using a power supply and magnetrons using an isotope.

In some cases one will need a power supply only to start the nuclear magnetron since in production the magnets are added last. By adding magnets last the electrons from the isotopic cold cathode can cause a buildup of an electrical charge on the anode block of the device. If both the anode block and isotopic cold cathode have the same amount of charge the anode block will not allow electrons to flow toward it. By adding a power supply from the anode block to the isotopic cold cathode and applying a current you allow the excess charge on the anode block to be reduced and for the electrons to flow from the isotope to anode block. The voltage used must be about the same as the isotope produces or the voltage that the magnetron requires to start. These two start values can be quite different due to the impedance of the cold cathode isotope. Lindner (U.S. Pat. No. 2,517,120) teaches how to calculate an isotope's impedance. The power supply must be of sufficient current to at least match the isotope current used in the device.

The same can be said for alpha particle isotopic cold cathode magnetron devices. The only difference is the power supply polarity must be reversed due to the nature of the isotope having a positive charge. See FIG. 24.

The start time of the magnetron using a power supply may require several seconds to several minutes for the fields to form. But once started the device will continue to run until the flow of electrons from the isotope is stopped or the isotope runs out of electrons (an half life of the isotope or more). In most cases, once started you can remove the power supply from the device. Once the power supply is removed the majority of emitted electrons from the isotope are converted to RF or they become fall back electrons (see FIG. 13) that are removed by the concentric grids in the present magnetron. If the grids are absent in the device of the isotopic cold cathode it can be grounded to eliminate an excess of electrons falling back. (See FIG. 13) In most cases, the anode is isolated using an RF choke (inductor) but the electrical connection can be grounded once the device is started, allowing the anode block not to acquire a build-up of electrons that would stop emission from the cold cathode. The same can be said for an alpha particle device magnetron.

If the device is sufficiently large with large amounts of isotope you may not need a power supply to start the device, but keeping the device turned-off may be a problem. In this case one may need concentric grids to absorb the electrons being given off by the isotope or to limit the interaction space velocity. See FIGS. 25-28, using a closable stop switches 477-480.

Based on the information above, one should not consider the present device as a standard hot cathode magnetron. The concentric grids 462/463 in the interaction space of the invention patent are for power control of the isotope 12/412A to adjust its particle speed and velocity. See FIGS. 22, 29 and 30. This may also effect how the isotopic magnetron works with particular frequency inputs and power outputs. With a bias resistor 481 or 482 added to the grid or grids one can control some of the speed and flow of particles from the isotopic cold cathode.

One should also note that a standard hot cathode magnetrons does not have concentric grids around the cathode, whether it is a point contact type or doughnut type magnetron.

By definition a magnetron requires at least four resonators and a real SCW. Those with less than four resonators are nothing more than RF tubes and not considered a magnetron even if they use a magnet to control the flow or angle of electrons.

In almost all cases one requires some kind of power grid 462/463 around the isotope to stop operation of the device if needed, as seen in FIGS. 17 and 18 and FIGS. 20-21. These grids stop or retard the flow of particles from the isotope or short the power of the isotope to ground or stop it from reaching the anode block. Or they may short the particles to the anode by bypassing the magnetic field in the magnetron.

As a secondary function, the grids may also be made to limit the amount of secondary emission causing heating of the isotopic cold cathode from particle fall back.

Magnetrons are primarily designed to work around a set of very narrow frequencies. They are, for the most part, not considered to be a wide band device. However, one can design them to work over many different frequencies, over a wide band but used only in a very small segment of frequencies in that band.

In this invention are different types and styles of magnetrons used in standard operation modes but all of these devices, if converted to an isotopic cold cathode, would require modification for each type to work optimally. Computer programs today now can do most of such calculations. But one still must consider the geometry of the path of instant acceleration electrons (beta electrons) to make the device work optionally.

Figure 17:
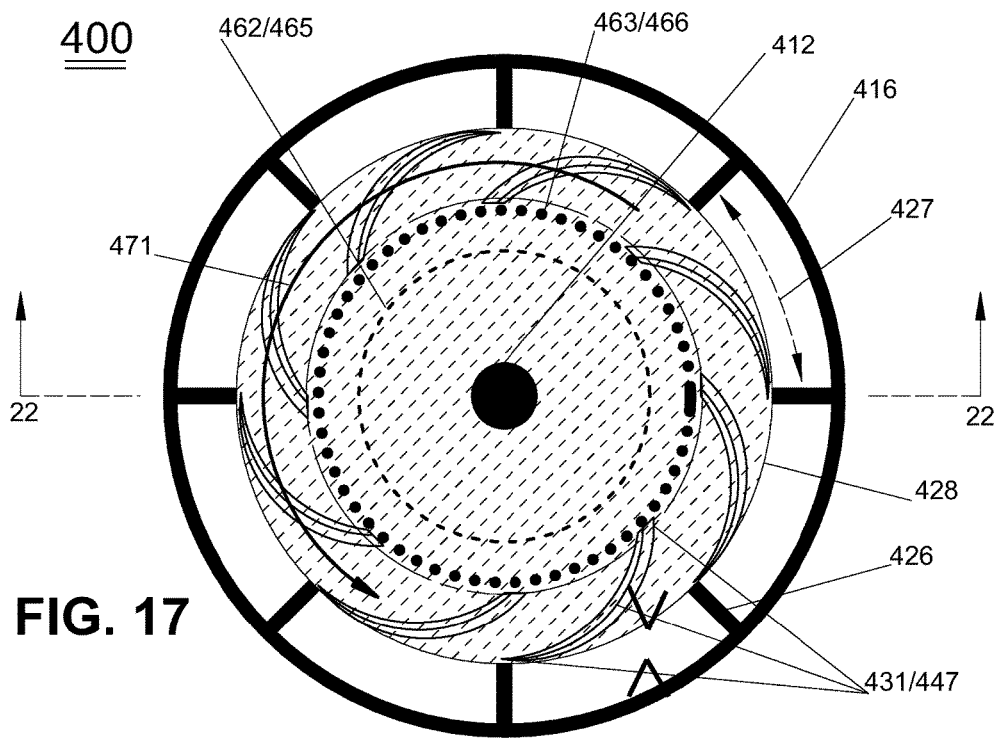
FIG. 17 is an embodiment of the structure of FIGS. 3, 4, 6 and 14 in which two sets of concentric grids are positioned in the interaction space to control the velocity of electron emission and curvature of rotation of the space charge wheel.
Figure 18:
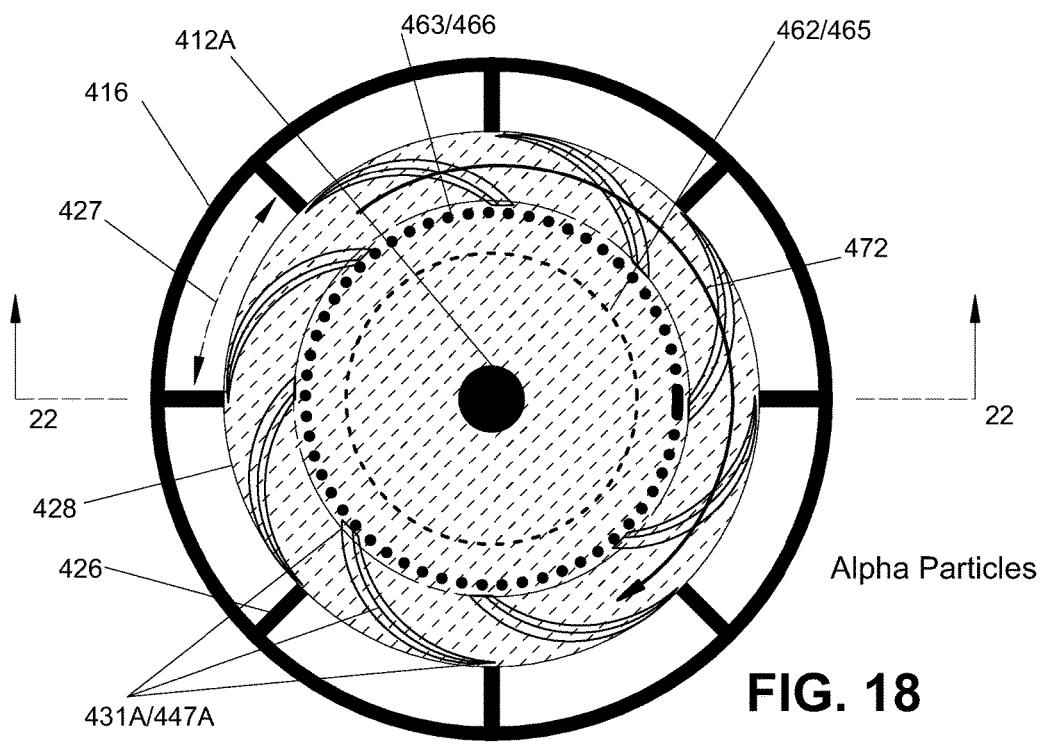
FIG. 18 is a view, similar to the embodiment of FIG. 17, however showing the use of an alpha particle cathode and its associated reverse direction space charge wheel, relative to the beta cathode in the embodiment of FIG. 17.
Figure 31:
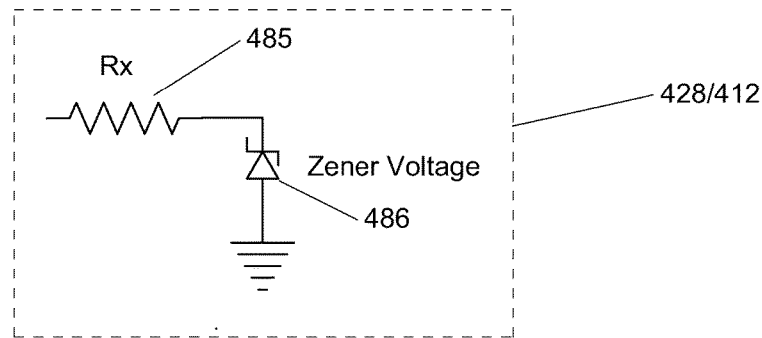
FIG. 31 is an equivalent circuit diagram for the internal impedance of a cathode magnetron.
Figure 32:
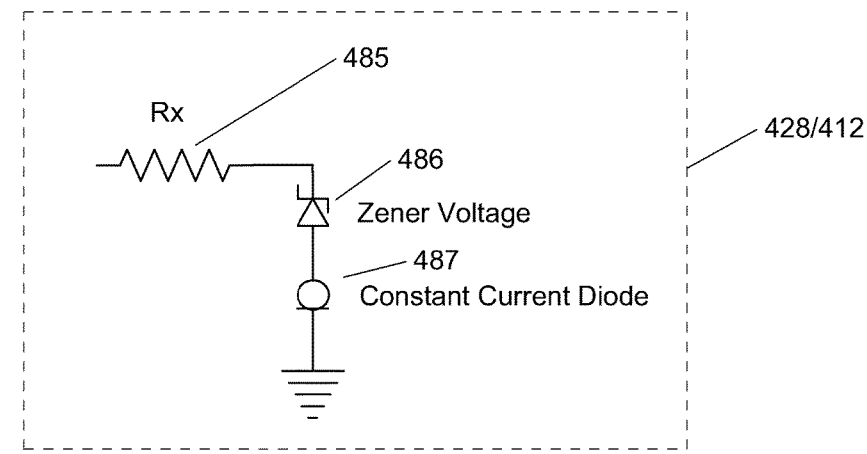
FIG. 32 is an equivalent circuit diagram for the internal impedance of an isotopic magnetron in accordance with the present invention.

The operational voltage range of the SCW 131/231/431 can vary from 1000 volts to nearly one million KV (1 MeV) per the particle range used by the SCW, as set by the design of the isotopic magnetron. See FIG. 17, showing an arms 447 of the SCW 431 turning. The impedance 485 of the arms is also represented in FIG. 32 which is an approximation of an electrical configuration equivalent of the present isotopic magnetron. One can see in FIG. 31 that a hot cathode device is different in operation and therefore has a different electrical equivalent circuit. Based on all information provided above it is apparent that an isotopic magnetron must be designed much differently from a hot cathode magnetron.

The operation, to a large degree, of any magnetron device depends on how it is designed. Devices that operate at 20 KVa may operate as high as 50 KVa or as low as 10 KVa. A small or low voltage device may generally operate at 4 KVa but can function down to 1 KVa and up to 6 KVa. That is, these devices can be built for a large range of voltages. A 500 KVa device is not uncommon in magnetron design and is well suited for lower high voltage isotopes in the 100 KV to 500 KV range.

Most pulsed magnetrons can be run in a CW mode (continuous wave) at reduced power. But, CW magnetrons cannot be run in pulse mode because, in most cases, the fields take too long to form. The microwave oven is a prime example of a CW magnetron that is designed without point contact magnets. This type of magnetron runs as a CW type magnetron with high power. Although X-rays are produced in some regular high voltage external powered magnetrons, extra caution should be taken in building a nuclear magnetron.

Alpha Particle Systems

Alpha particles in a cold cathode magnetron present other issues that are not generally apparent. Standard hot cathode magnetrons in fact can't produce alpha particles. The isotopic magnetron however can use and produce alpha particles but using a different isotope than for beta electrons. All things being equal in general design terms of a magnetron, the SCW of alpha particles will spin backwards or in the reverse direction of beta particles. See FIGS. 18 and 21 and elements 472/488 which show the arms 447A and rotation of the SCW 431A, and how it is reversed compared to FIGS. 17 and 20.

The alpha particle is about 7300 times the mass of a beta particle and has $3.2 \times 10^{-19}$ Coulombs of charge where as an electron has $1.60217657 \times 10^{-19}$ coulombs of charge.

That is an alpha particle, the mass and charge of about four protons, having the atomic weight of helium. This means that an alpha particle can and will produce about two times the power of a beta magnetron, based on the rate of emissions by the isotope and if the emission speed of the alpha particles were equal to that of beta particles for the same design parameters of the magnetron.

The downside of use of alpha particles is they induce more damage to structures inside the magnetron because of their greater mass. But with present technology it is possible to use alpha particles in a nuclear magnetron that would work for many years.

Note that Okress (U.S. Pat. No. 2,492,313) and La Rue (U.S. Pat. No. 2,922,075) show point contact type magnetrons. In a general sense, if a design requires substantial power from the device and in a point contact application, only alpha particle isotopes would be of use due to the small available size of the isotopic cold cathode area. This is not to say that beta isotopes could not be used in a point contact design, but for more power the alpha particles are a better choice.

Cathode area and size is the main constraint to power in a nuclear magnetron. For example, Kato (EP Patent 2,237,304) teaches magnetrons using large cathode size elements in high power applications. Similar types of magnetrons are also useful with a nuclear isotope as a power source, although the frequency values may differ from a standard magnetron due to the isotopes used.

Figure 22:
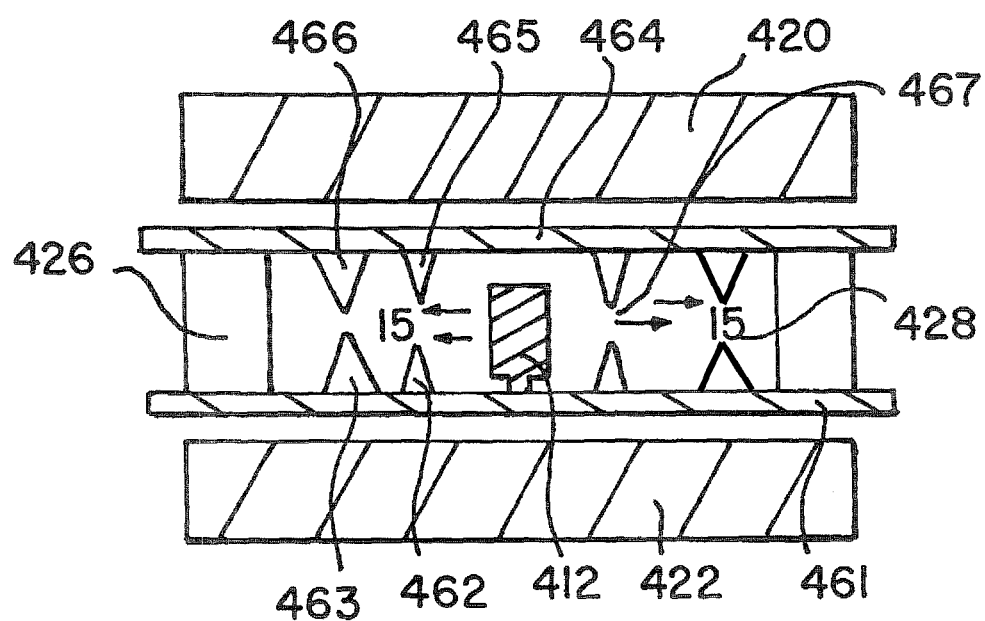
FIG. 22 is a vertically exploded view taken along Line 22-22 of FIG. 17.

In FIGS. 17 and 22 are shown further embodiments of a magnetron 400 which resembles the embodiment of magnetron 100 (see FIGS. 3, 4, 6 and 10) in that it is also a slot magnetron including, particularly, slots 426, cavities 427 therebetween, a radial cross-sectional geometry defined by housing 416, an isotope cathode 412, and interaction space 428. The embodiment of FIGS. 17 and 22 however differs from that of magnetron 100 in its use of concentric grids 462 and 463, more fully shown in the vertical axial cross-sectional view of FIG. 22. In this embodiment, a single grid 462 may be employed which projects upward from a dielectric or inert rigid surface 461. As another option, a second grid 465, technically a part of a composite first grid, projects downwardly from upper dielectric or inert surface 464 as a result of such an appropriately biased grid 462, which may include said upper grid 465 disposed at a like radius from cathode 412. The path of high energy electrons 15 may be confined to an opening 467 between the teeth of the upper and lower grid and, more importantly, the velocity of said electrons may be retarded for purposes of optimizing the curvature of circular rotation thereof within interaction space 428 and, as well, of reducing the energy of electrons 15 to a level which is more practical to use within magnetron 400, that is, that will cause less damage to the physical structure of the device than would unretarded electrons. Where an additional level or degree of control of electron path and velocity is considered necessary, a second concentric lower grid 463, may be employed and a similar, but downwardly projecting grid 466, may be added. In this embodiment, the interaction space is the annular region 428 which is outward of the outer biasing structure 463/466 but inward of stubs 426 of the magnetron. Further shown in FIG. 22 are upper and lower magnets 420 and 422 respectively.

Design of SCW

The SCW 131/231/431 (see FIGS. 10, 11, and 17-21) is complex to design because it must take into account the interaction space 428, the isotope's impedance, the magnetic field strength and the number of resonators 427. Note that this wheel acts differently in some respects from that of the normal hot cathode magnetron due to the fact that the arc angle of the instantaneously accelerated beta electrons (or alpha particles) used in the SCW 431 causes the rotational speed to be different due to the nature of the acceleration of the electrons emitted from the isotope. The arcs of the emitted electrons 471 from an isotope change the wheel's speed rate since they are instantaneously accelerated electrons in a magnetic field. This may seem trivial but in fact may stop the nuclear magnetron from working if the spacing of the SCW spokes 447 and interaction space 428 are not taken into account. The wheel 131/231/431 may spin too fast for the resonators 427 and this relationship could stop them from working or may affect the amount of output power the isotopic magnetron can produce.

Figure 19:
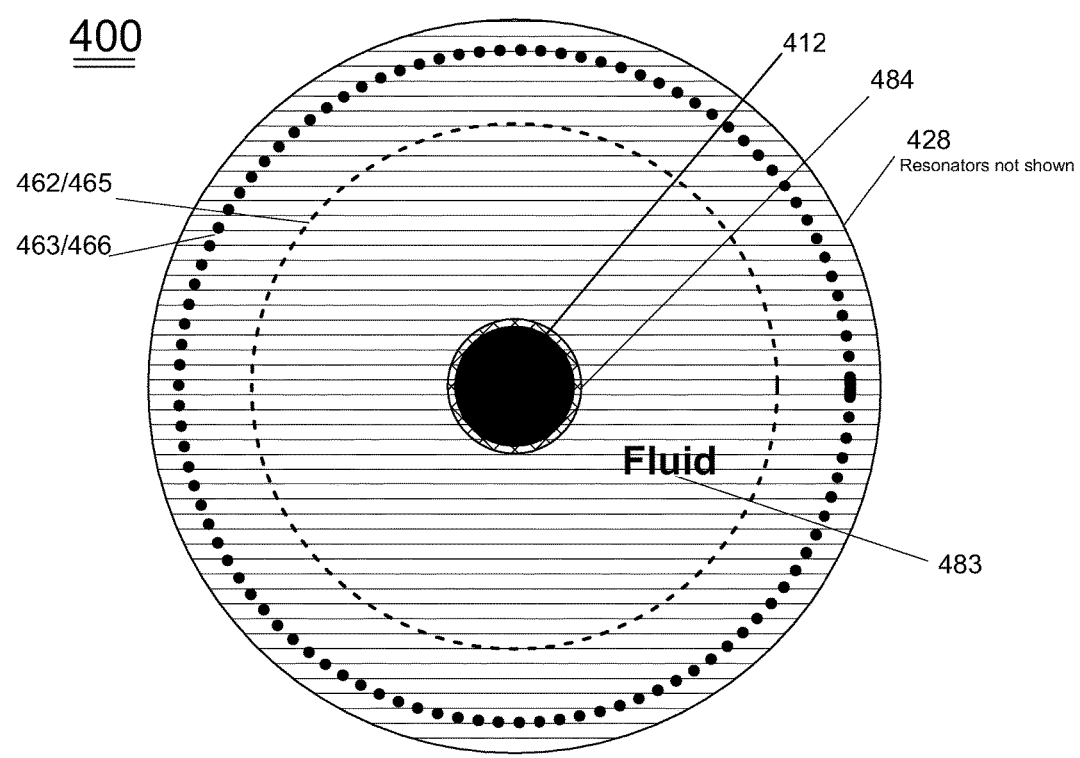
FIG. 19 is an exploded view showing the insulation layer of the cathode isotope together with the use of a non-ionizing fluid in the interaction space of the magnetron.

The SCW speed can be controlled in several ways, the most obvious method being to add a non-ionizing fluid 483 to the interaction space 428 in the device to slow the wheel down as needed. FIG. 19 indicates fluid 483 added to the interaction space. This fluid can be pressurized to different levels inside the device to adjust its speed. The second method is by using a concentric grid system (FIG. 19, grids 462/463) in the device to slow down the particles' emission speeds. If using alpha particles verses beta particles, the added fluid will change the speed quite a bit as the alpha particles are 7300 times more massive, It is at the SCW's spokes 147/247/447 that the impedance matching for the resonators must take place. As with all resonators they have impedance and each spoke (singular) should match the impedance of each resonator 427. If one knows the quantity of beta electrons emitted by the isotope, one can approximate the total current. If one knows the number of spokes in the SCW of the device, one can divide that current into equal parts to match the number of spokes in the SCW 131/231/431. Since we know the isotope's voltage and/or speed of the electrons impacting the concentric grids, this gives us an approximate impedance for each spoke in the SCW (see FIGS. 17-22).

The resonators in an isotopic magnetron will generally be very different in impedance from a standard hot cathode magnetron. This is due to the fact that hot cathodes generate huge numbers of electrons in a small area of the hot cathode, whereas isotopes in most cases generate much smaller numbers of more energetic electrons for the same amount of area used by a hot cathode.

What can be said about the beta-electron SCW can also be said for the alpha particle SCW. With all things equal in design, the alpha SCW 431A will rotate backwards from the beta SCW because of the positive charge on the alpha particles. See FIGS. 18 and 21. With all other parameters equal, alpha particles will have different impedance spokes on its SCW 431A and require resonators that match that impedance due to the change in size of the particles and the amount of charge they have. Since its size is 7300 times larger, so is its charge.

Figure 20:
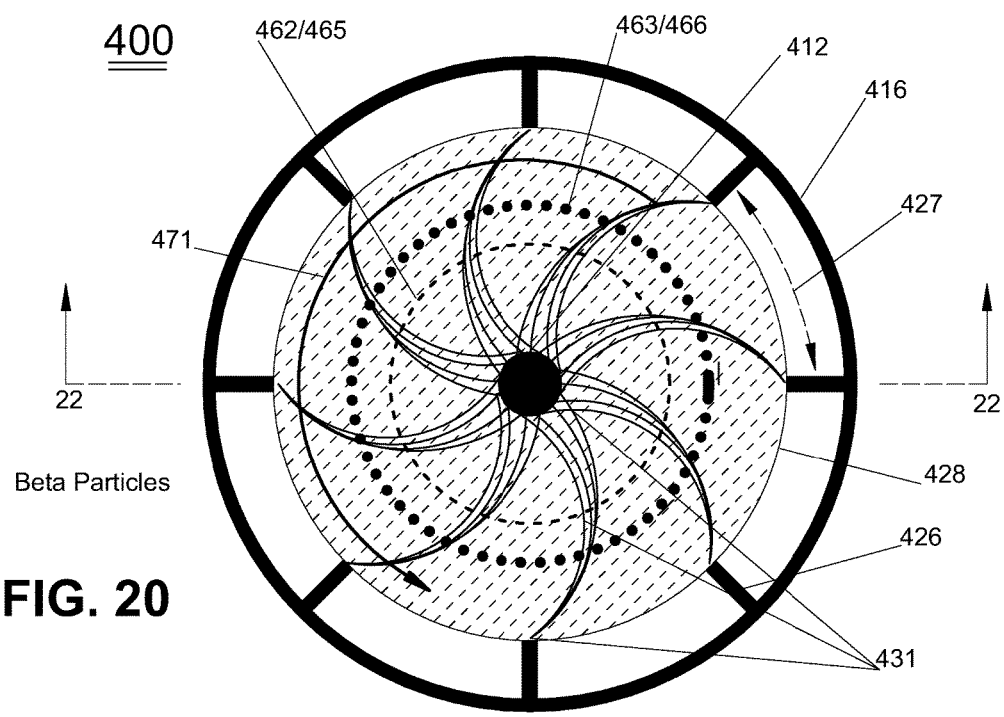
FIG. 20 is a view, similar to FIG. 17, however in which due to the design parameters particular to the emission quantity, velocity of a beta electrons and the biasing of the grids, the space charge wheel, unlike that of FIGS. 17 and 18 above, occupy the entire radial distance between the cathode and the magnetron cavities.
Figure 21:
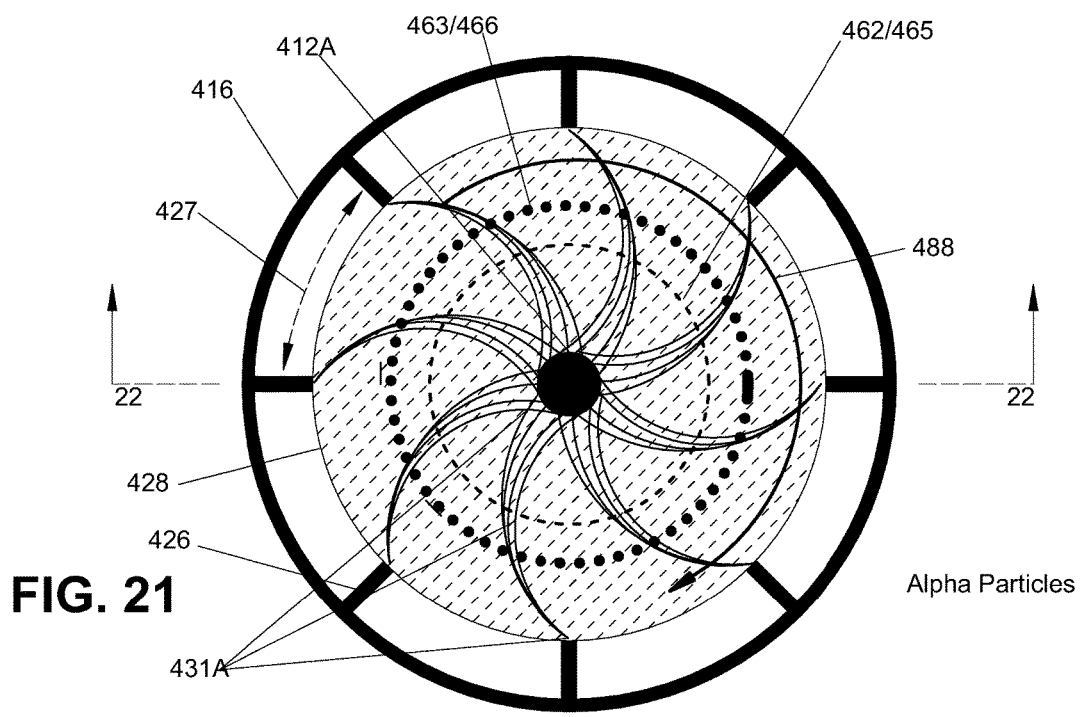
FIG. 21 is a view of an embodiment, similar to that of FIG. 20 in which alpha rays or particles are used in lieu of beta-isotopes as the cathode, this resulting in a space charge wheel rotating in the opposite direction, similarly to that shown in FIG. 17.

When addressing the SCW the concentric grids 462/463/466 (FIGS. 17 and 22) must be taken into account. Depending on the design, the concentric grids can interact with the SCW in two ways. The SCW can operate in the area from the isotope cathode to the anode block as part of the standard rotational interaction space 428 including the concentric grids. Or the SCW 431 can operate in the area from the outermost edge of the concentric grids to the anode block as seen in FIGS. 17 and 20, meaning that the SCW starts at the outside of the concentric grids and ends at the anode block 416. Only this part of the interaction space 428 is used for the SCW when the concentric grids are tightly spaced as to not allow the SCW to form beyond or behind the concentric grids, thus creating another species of the isotopic magnetron because the operation of the SCW is then somewhat different in its position and rotation. Again, the SCW rotational speed will differ as will other parameters associated with it. Since no hot cathode magnetron has "concentric grids" this is a new species of magnetron.

Standard magnetrons with hot cathodes have a current flow that can be measured through the cathode. From an electrical engineering perspective, this is a closed loop current device producing RF energy at some frequency. See FIG. 21.

The inventive isotopic magnetron is not a closed current loop and it would not be apparent that an isotope would work in this such case because of the lack of standard type tube current loop in the device. The fact that resonators have an oscillation current loop and convert the energy from the particles is why my device works as it does. In fact, the cold cathode (nuclear isotope) is what is known as a mass reduction emission, giving off beta electrons or alpha particles, but having no current loop like a standard hot filament tube. That is, the isotope's mass is reduced by the W force process as it emits quarks. This is a major difference between the two devices, an isotopic magnetron and a hot filament magnetron. Further, an isotope's half life will, at the end of its first half life, produce about half the amount of emissions as it does when it is new. This affects many parameters of the device, the SCW being one of them and this, in turn, affects the impedance of the resonators of the anode, all of which need to be addressed at the start of the design process for optimal results.

The SCW's speed is generally determined by the voltage from the isotope that is applied in the interaction space of the magnetron. If the voltage from the isotope increases, the SCW's speed (angular velocity) will increase or, as the voltage goes down, the speed will decrease. At the same time the particles, or emissions, from the isotope will bunch up because of the resonators reaction to spinning fields of particles and the magnetic cross section of the field reacting with the resonators. See discussion of FIGS. 11 and 13 above. All this is standard magnetron theory of SCWs at this time. When the SCW is running it also performs another function, that is, the bunching of particles produces an averaging effect of different speed particles. Lower voltage particles are somewhat speeded-up and higher speed particles are somewhat slowed-down. This effect occurs due to the interaction of the magnetic and static fields of the particles and their repelling of each other because of their like fields. This causes the bunching and averaging effects to happen as the SCW passes the anode poles 29/129/229 in the device.

The interaction spaces in the isotopic magnetron can accommodate voltages between 1000 volts and 1 million volts (1 MEV) between the cathode, with or without concentric grids, and the anode block. It is the interaction space 428 where the SCW forms. See FIG. 17-21. However, this is just the breakover voltage range for the correct operation of the resonators 427 to function in the isotopic magnetron. See FIG. 32.

An isotopic cathode may have even higher values of isotope voltage than is used in the SCW range, above, depending on if the cathode has any insulators or conductive coating on it. These coatings, or particle insulators, may retard or limit the voltage and/or slow the particles down coming from the isotope, which is desirable in may applications. The concentric grids may also slow down or adjust the impedance of the SCW as needed to make the magnetron function correctly. Since the magnets that are used with a magnetron are subject to variations, aging, and loss of field strength, one may also use the biasing of the concentric grids as an adjustment to the SCW 431 for correct operation as the magnetic field changes to help in changing the geometry of the moment arms of the particles.

All magnetrons exhibit what is known as a threshold current V1. This is the current flow from the isotopic cold cathode, or a hot cathode, that allows the magnetron to operate without shutting off. This means one needs a threshold of charge or certain number of electrons/particles emitted by the isotope or hot cathode to define enough electrons to form a fully functional SCW and to make the resonators 427 operate correctly. This should be considered the V1 low voltage point of the magnetron. The SCW, if it were of alpha particles, would have the same design criteria applied to it even though they would turn in the opposite direction from beta electrons with all things being equal in the design. See FIGS. 18, 21 and 26. Because of the VI law point, a magnetron can operate without an RF impact to one or more anode cathode cavities at another location.

Cristea (see Background of the Invention) assumes by adding more resonators you get more power. This, in fact, is a poor assumption. Adding more resonators in some cases will decrease the power from the device due to impedance factors in the SCW being changed and may even stop the device from working. Cristea was mistaken in this case and did not fully understand magnetron design nor did he mention SCWs or how they work.

The output port 41 is based on standard magnetron principles and its selection is based on frequency bandwidth and the internal design of the magnetron. See discussion of output port 41 and waveguides 42 above, per FIGS. 1-2.

All circuits must have a closed current path. However, the isotopic magnetron defies this rule, making it more difficult to understand: isotopes (cold cathodes) do not have a current path as such. From a technical point of view the current path happens at the moment of decay of a quark of a beta or emission of a helium particle in an alpha isotope.

There exist physical limitations on the size of a magnetron that can be built due to losses in the device that exist at microwave frequencies. This limits the interaction space and the mass of the isotope that can be used. The frequency of the device also has a bearing on its size. This however does not affect its power. There exist devices that are 6 to 15 inches high and at least and 8 inches wide that produce 50 Kw of CW power that are water cooled, in the 2.4 GHz band, using regular hot filament magnetrons. This is not to say that in the future with new materials that the interaction space could not become bigger in an isotopic nuclear magnetron device to allow for more power. That, the size and power of the magnetron of the inventive device is set by the engineering limits of its materials and frequency.

Isotopic Cold Cathode Emissions

Some assume that cold cathodes and hot cathodes emit electrons in the same way. This is not true and is one of the more interesting things about a cathode isotope. Its emissions can occur at any angle provided it is not emitting into the material holding the isotope and/or parts of the mounting for the isotope. Particles that do this are just losing energy and/or turn into X-rays, gamma-rays or secondary particles with less energy. This is why some may wonder why a cold cathode works. If one assumes that all angles around the isotope total 360 degrees, then the vector sum of emitted particles is also zero. This is the same result as if one were using a hot filament cathode in a standard magnetron which entails an assumption that all electrons come off a planar hot cathode in the form of parallel electrons. That is, only at the moment of acceleration do the electrons assume a field-defined trajectory toward the anode block. Until that point they do not have any path.

One may want to place some mechanical restrictions on or about a cold cathode to help aim the emitted particles in a way to increase the efficiency of emission. This is not to say that the device would not work without aiming the particles, just that the efficiency of the inventive device can be improved. This too is very different from how a hot cathode magnetron works with its current-like flow of electrons from the cathode to the anode block. Hot cathodes produce a type of self-aligning flow of electrons because of the electrical charge (bias) at the anode and the fact that the electron starts from a neutral position in the hot cathode, is aimed at the anode block during its acceleration period, and is within a uni-directional E field.

None of this self-aligning flow of particles occurs in a cold cathode magnetron. Therefore one may want to improve the particle emission by using mechanical means to enhance alignment flow of particles in such a device. I note that in both the isotopic magnetron and hot cathode magnetron, once the electrons are emitted and/or accelerated, the SCW disrupts the angular flow of particles. And in both cases, only the number of particles and the energy level (speed) of the particles matters in the basic design. Particles from a nuclear cold cathode that don't produce a backward flow to the SCW are better than ones that do. One might think that this would stop the cold cathode magnetron from working but in fact the magnetic field at the cathode always sends the majority of its particles in the correct direction at the time of emission. Some of this relates to the arc moment length. That is, the magnetic field will send the particles in a radial direction but subject to the E×B vector when the electrons are emitted from the isotopic cathode. By having the SCW form on the outside of the concentric grids one can eliminate any back flow problem of particles in the inventive device. Or one can design the isotopic cold cathode with mechanical limits (e.g., particles guides) to limit particles' back flow or preventing turning of the SCW in the reverse direction.

One can see from the statement above that back flow particles can be mitigated with more anode pole surfaces in the design, as in a SCW. This is less of a problem with back flow particles because the SCW interacts with the back flow particles as it turns, producing an averaging effect as noted above.

Figure 41:
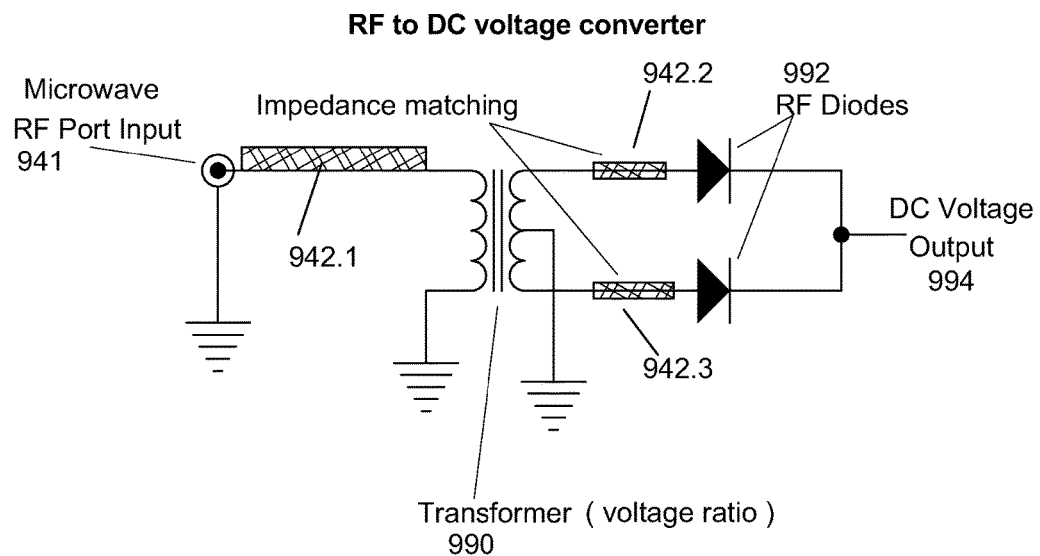
FIG. 41 is a schematic diagram of an RF to DC voltage converter using an output port of the inventive system.

This inventive system is considered to be a power production device to convert high voltage electrons (beta or alpha rays) to usable RF (radio frequency) energy. See FIG. 41. By using RF one may produce voltages in the lower ranges that are good for powering integrated circuits. One can do this by attaching an RF to DC converter to a power port 941 of the magnetron or making it as part of the magnetron. One might also be able to use such high power RF for other uses such as part of a drive for ion drives for spacecraft. And other things set forth herein in other sections.

The power conversion process for the RF to DC voltages takes the form of an RF transformer 990 with RF rectification by diode 992. Apparently impedance matching 942.1 and 942.2, .3 are provided at outputs of the transformer, e.g., microstrips or strip line. The RF is coupled to the port 941 of the isotopic magnetron and into the port of the RF transformer. The ratio of windings or elements in the RF transformer allows the RF to be changed to the desired operational voltage and rectified to a DC voltage set forth by the coupling ratio of the RF transformer. The RF rectifiers (RF diodes) 992 produce a high frequency rectified DC voltage 994 thus producing a voltage that is usable for integrated circuits. Associated filtering and voltage regulation control may also be required. All of the DC conversion preceding may be a part of, or integrated into, a magnetron.

Or it could be external to the magnetron as a separate section or have several different power conversion sections attached to the port of the nuclear magnetron. One having microwave design experience would understand, and have knowledge of how, this process works as there are numerous types of designs for this. Again this is left to the engineer as to what will work best for one's design based on frequency, power and size based issues. I simply state and show some examples of this power conversion herein.

Since RF energy has many uses that are too numerous to name I have set forth examples herein for some of those uses.

In some cases where large power conversion may be required the Cyclotron Wave Converter (CWC), an example of which is set forth in the Journal of Radio-Electronics, No. 9, 1999, entitled "High Power Converter of Microwaves" would be a better option to produce higher current values and larger voltage ranges. The CWC is a "single frequency" type of converter for RF energy and is not designed to convert wide band RF. From an engineering point of view the CWC does not seam like a good match for the nuclear magnetron as a power converter because of the frequency shift and noise produced by the nuclear magnetron. But there are ways to lock the two devices to the same frequency. Farney (U.S. Pat. No. 5,084,651) teaches several different methods to lock a hot cathode magnetron to a frequency. By using Farney's method we would be able to lock the nuclear magnetron to a single frequency and applying these same methods to the CWC, we also would be able to lock the CWC. However, Farney says nothing about using his invention with an isotopic nuclear cold cathode in a magnetron or a CWC. One also might link, or tie together, any number of isotopic magnetrons though a power combiner and run them all into a single CWC for better efficiency or increased power. Again, the device would have to be frequency locked using Farney's or some other method. The CWC locking method is not shown in this invention patent but the techniques are known in the art. Nuclear magnetron with CWC.

Figure 33:
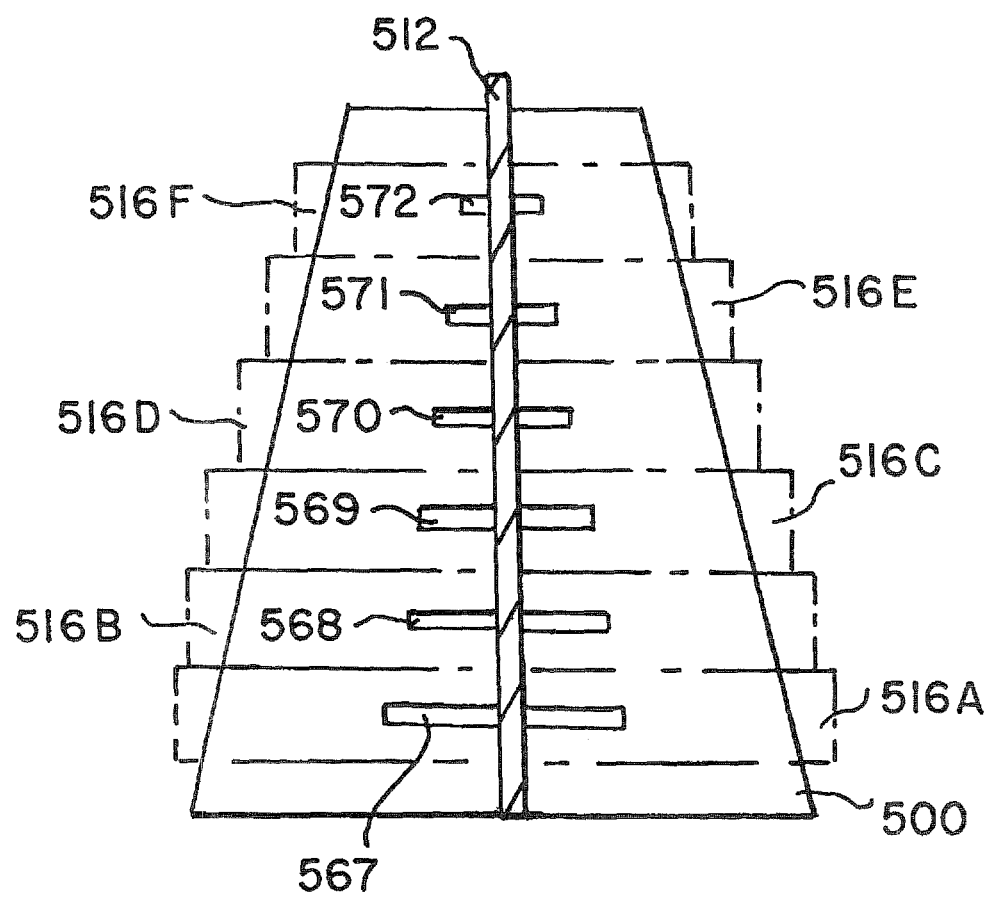
FIG. 33 is a vertical, radial cross-sectional view of a further embodiment of the invention which employs multiple anode blocks.

With reference to FIG. 33, there is shown a further embodiment 500 which comprises a Mayan pyramid-like structure having a number of discreet layers, each representing a separate magnetron and each consisting of the above-described three basic layers, namely, an upper magnet having a first magnetic polarity, an anode block, and a lower magnet of opposite magnetic polarity. Accordingly, each of the vertical layers of the embodiment of FIG. 33, denoted as layers 516A, 516B, 516C, 516D, 516E, and 516F are understood to include each of the above-described three basic layers of the inventive system, above described with reference to FIGS. 1-14. The embodiment 500 however differs in its use of a single cathode 512 which is shown as a single vertical rod in FIG. 33. This embodiment is also characterized by its use of a polar or horizontal slit in a grid which slit may repeat in a circular pattern about each of the constituent layers of FIGS. 16A-16F. In other words, slits 567 thru 572 each exhibit a different length or polar dimension, one purpose of which is to limit the integral of the energy of electrons that can escape through a given grid slit 567 thru 572 of a particular one of said layers 516A thru 516F. The rationale of this approach is to limit or control the total energy of a given group of emitted beta decay electrons to one which is suitable to the geometry and other operating parameters of the particular magnetron within each of said layers 516A thru 516F. Also, the energy of individual electrons which can escape through a given grid slit 567 to 572 is also affected by the strategy that the E×B vector will cause greater electron curvature (see FIG. 1) in the case of more energetic electrons. In view thereof, the topmost layer 516F and its corresponding small slit grid 572 would block more high energy electrons (because of their greater curvature) than would be the case at the other layers having larger slits. Conversely, where a cathode possesses an isotope which is weak in terms of either density of electron emission, position on the beta energy spectrum for that isotope, or in terms of mixture of the isotope with a non-isotope, for example for purposes of radiologic safety, then a layer 516A-E having a larger slit than slit 572 respectively, may be selected. It is to be appreciated that each of the individual layers of the embodiment of FIG. 33 may be produced or provided individually. It is however believed that applications exist in which it is more efficient to match a given anode geometry with a given emission velocity, density, energy integral, or E×B curvature, with the microwave outputs of different structures tied together to the intended load, rather than used individually.

Figure 34:
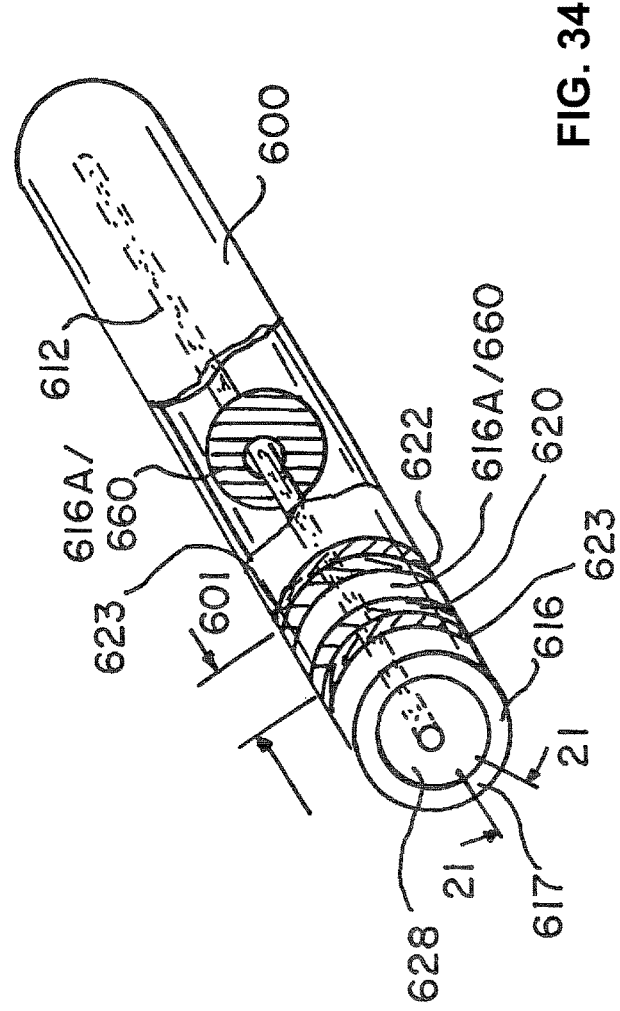
FIG. 34 is a perspective view of another embodiment of the invention.

Shown in FIG. 34 is a further embodiment 600 of the present invention This embodiment, like that of FIG. 19, employs a common anode rod 612 upon which are stacked groups 601 of a lower magnet 620, an anode block 616A, and an opposing magnet 622. Each group 601 is separated from the next successive group by a magnetically insulating layer 623. In this embodiment, as with the other embodiments above described, a dielectric 660 may be inserted within either or both the interaction space of anode block 616A or the anode cavities 627 of the anode block. These dielectrics, wherever positioned, may be tunable, as is known in the art of dielectrics, as taught in U.S. Pat. Nos. 6,774,077 and 7,060,636. The significance of use of a dielectric (in this case could be some noble fluid or liquid under pressure, the commonly used fluid is argon fluid under pressure) in the interaction space is that the extreme velocity and momentum of the beta decay electrons may be mediated and more readily adapted in radius of rotation about the cathode within the interaction space to achieve objectives of improved life of the structure and, where the dielectric is used within the anode cavities, to tune the LC equivalent circuit (see FIG. 9) of the cavity resonators to produce microwaves of optimal frequency for a given application and for impedance matching to a wave guide or other system output. A simpler view is that slower electrons produce better efficiency in the resonators, where design constraints exist. This is an impedance type matching tool used to better match the resonators to the electrical characteristics of the emissions from the isotope.

Figure 35:
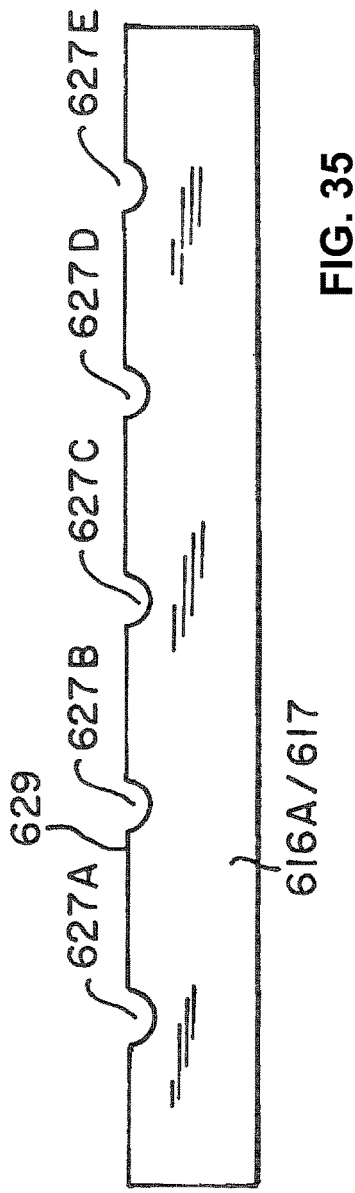
FIG. 35 is a flattened view of the anode array of an anode block of an axial segment of the embodiment of FIG. 34.

In FIG. 35 is shown a flattened polar sectional view, as indicated by curved arrows 24-35 in FIG. 34. FIG. 35 thereby shows that within a given segment 617 of anode block 616A may exist a plurality of cavities 627A-627E, each having an axis which is co-linear or parallel with the B vector of opposing magnet layers 620 and 622 (see FIG. 34). It is to be appreciated that said anode block 616A may be printed upon a flexible integrated circuit (IC) substrate as may be anode surfaces 629 between each of said anode cavities 627A-627E. After printing, the structure shown in FIG. 35s simply bent into the annular form, as reflected in all embodiments of the invention. In this process, dielectric material 660 may be disposed within the interior radius of the anode block 616A when it is bent about cathode rod 612, or printed on the IC substrate. In this embodiment, the properties of dielectric 660 may be electronically modulated through the use of circuit chip to optimize the above discussed characteristics of electron emission, density, curvature and effective LC parameters of the anode cavities 627.

As may be noted in FIG. 36 single anode block 617A, whether in the context of the embodiment of FIG. 34 or in connection with any of the other embodiments above, may employ anode cavities of differing cross-sectional geometries, for example, the geometries of cavities 627A, 627F, 627G, and 627H. Such different geometries will of course produce significant differences in microwaves resultant from them and will also affect the rotation of the election cloud within the interaction space. FIG. 36 also shows anode surfaces 629A separating the respective anode cavities.

FIGS. 37 and 38 show that the durability, that is, effective life of the magnetron in any of the embodiments of the invention may be improved through the deposition of a highly durable material, such as industrial diamond or carbon 670 or 672 respectively upon the surface of anode cavities 670 or 671 respectively, shown in FIGS. 37 and 38. The deposition of such surfaces of a non-reactive material including carbon, silicone, titanium, or composites thereof will considerably increase the effective life of the anode structure relative to the system of Brown and others. In other words, maintaining of the smooth surfaces and geometric integrity of the magnetron, once properly tuned, is an essential aspect of the practice of the present invention. With this aspect in mind one should understand that diamond would also change the impedance of the resonators and greatly improve the life of the device with only a couple molecule layers of diamond added to the devices resonators and interior walls that are exposed to the electron or alpha flow in the device. This would be a great improvement what would other wise be almost impossible to achieve with a standard industrial magnetron that is build with silver coating on copper or copper iron type magnetron.

Figure 42:
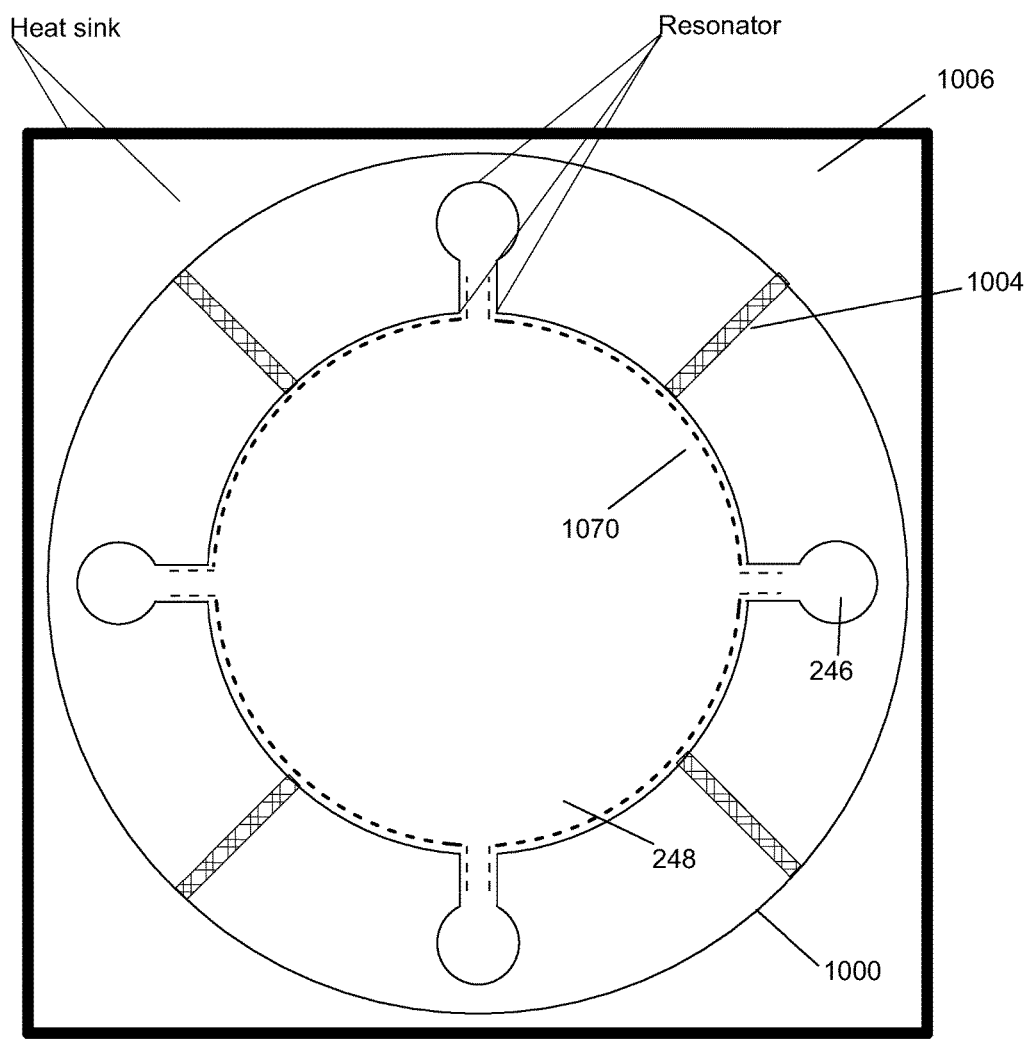
FIG. 42 is a schematic diagram of a further embodiment of the hole-and-slot magnetron of FIG. 12, the principles of which are applicable to all cold cathode magnetron.

In using a diamond coating 670 OR 1070 (see FIG. 42) as part of the anode block in this way as part of the cavities 246 we can conduct heat from the magnetron 1001 at near the speed of sound, through diamond heat conduction path 1004, allowing for a small device to produce more power than it normally could because of the high rate of heat transfer that diamond allows for. This would be a benefit to builders of magnetrons that require better heat flow and reduction of the heat that is applied to the magnets allowing for better magnet life since high heat can reduce a magnet's strength or life over time. One should understand that diamond and types of man made carbons also can produce these high heat transfer effects. See FIG. 42. The magnetron, preferably, is also immersed in heat sink 1006, to assist the heat gradient out of the magnetron.

Figure 39:
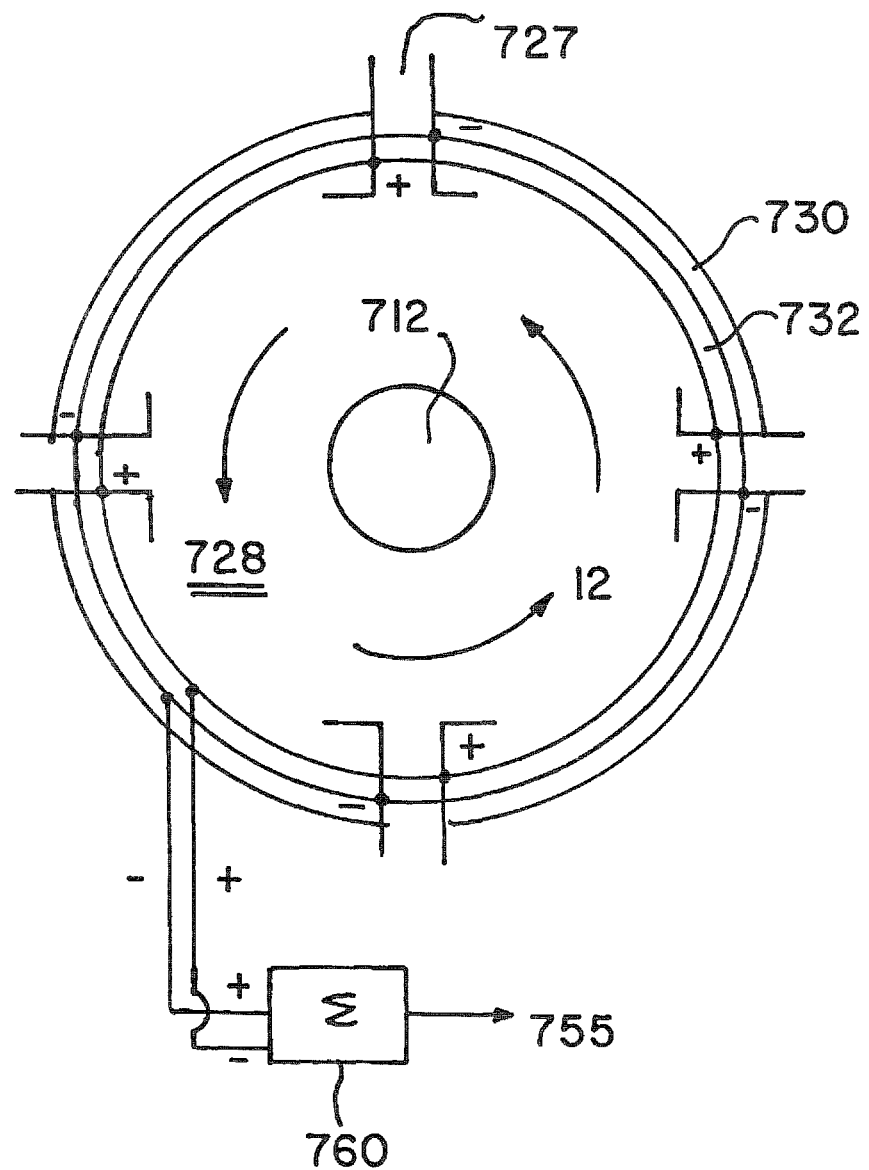
FIG. 39 is a schematic view showing use of antennae in lieu of cavities as system resonators

In FIG. 39 is shown a schematic of a further embodiment 700 of the invention in which a polar array of antennae 727 are used as a functional equivalent of said anode cavities. Therein, a cathode 712 emits beta decay electrons 12 which, as in other embodiments, rotate within an interaction space 728. However, the resultant obtaining electron cloud induces the above-discussed LC values and excitation to antennae 727, as opposed to said cavities 27/127/227/327 of the other embodiments and induces positive and negative polarities. These polarities are strapped together by strapping means 730 and 732. Said antennae will resonate in like fashion to said cavities. Said strapping is used for purposes of phase lock, amplitude control and communication of output 725 to an optional power port, wave guides (not shown), and a power combiner 760.

It is to be appreciated that the principles of the present invention are equally applicable to use with a cathode characterized by the emission of alpha or gamma particles, providing appropriate shielding exists in the case of gamma radiation.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth.

The invention claimed is:

1. A system for generation of electrical energy, the system comprising:
    (a) an elongate axially disposed emitter of isotopic particles;
    (b) a conduction block having an RF port;
    (c) said conduction block having an opposite electrical polarity relative to said emitter of isotopic particles forming between said emitter of isotopic particles and conduction block;
    (d) a potential defining a radial electrical vector E;
    (e) said conduction block disposed in a plane about said emitter of isotopic particles and having an interior radial periphery relative to said emitter of isotopic particles defining an interaction space;
    (f) an outer periphery of said interaction space defining a polar array of resonant cavities in said conduction block separated from each other by surfaces in communication with said interaction space;
    (g) each of said resonant cavities having an LC value, wherein each resonant cavity generates a resonant frequency responsive to a particular annular motion and energy of isotopic particles of a cloud of electrons and isotopic particles also passing said surfaces and a plurality of entrances of said resonant cavities;
    (h) an upper magnet outside and above the resonant cavity and a lower magnet of opposite polarity outside and below the resonant cavity, wherein said upper magnet and said lower magnet are in magnetic communication with said interaction space;
    (i) within said interaction space, a plurality of dielectric layers disposed about said emitter of isotopic particles have a radial slit defining a-segment;
    (j) each of said dielectric layers in a plane are substantially transverse to that of an axis of said emitter of isotopic particles in which a plurality of variables are radial at each of said dielectric layers and axial height of each of said radial slits;
    (k) each of said dielectric layers in a plane are substantially transverse to that of an axis of said emitter of isotopic particles in which an extent of transverse by each of said radial slits defines a radial region through which emitted electrons escape from said emitter of isotopic particles into said interaction space;
    (l) an extent of each of said dielectric layers exists outside each of said radial slits between said emitter of isotopic particles and a portion of the conduction block in a plane of each of said dielectric layers; and
    (m) a radius of each of said dielectric layers within said interaction space are of a lesser dimension than that of an inner radius of said conduction block.

2. The system as recited in claim 1 in which a plurality of grids are supported by at least one of said dielectric surface.

3. The system as recited in claim 2, further comprising:
    a dielectric layer separating said upper magnet and said lower magnet; and
    each dielectric layer disposed radially outwardly of said interaction space.

4. The system as recited to claim 1, in which each grid in a plurality of grids expand axially upwardly and downwardly from a plurality of rigid dielectric bases respectively abutting at least one of said upper magnets and said lower magnets.

5. The system as recited in claim 4, further comprising:
    a dielectric material disposed concentrically about a cathode within said interaction space to further an emission characteristic of emitted isotopic particles.

6. The system as recited in claim 5, in which said emitter of isotopic particles comprises an alpha isotope.

7. The system as recited in claim 1, in which one or more of said cavities include a dielectric material.

8. The system as recited in claim 7, in which properties of said dielectric material is tunable use by an LC value of each of said resonant cavities, including frequency tuning and impedance matching with a power port.

9. The system as recited in claim 1, further comprising:
    a plurality of dielectric materials disposed concentrically about a cathode within said interaction space to influence an emission characteristic of electrons, within an energy spectrum of said isotopic particles to an integrity of said cloud of electrons and isotopic particles in said interaction space, shape thereof, and density of effective LC values at said resonant cavities.

10. The system as recited in claim 1, in which a plurality of grids support at least one dielectric surface.

11. The system as recited in claim 10, in which said grids expand axially upward and downward from at least one radial dielectric base.

12. The system as recited in claim 1, in which at least one of said resonant cavities includes a dielectric material.

13. The system as recited in claim 12, in which said dielectric material includes tunable LC values within said resonant cavities.

14. The system as recited in claim 13, further comprising:
    impedance matching within a power port.

* * * * *